(12) United States Patent
Tomokuni et al.

(10) Patent No.: US 11,716,298 B2
(45) Date of Patent: Aug. 1, 2023

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventors: Kosuke Tomokuni, Kanagawa (JP); Kosuke Aoki, Kanagawa (JP); Seiichiro Hiratsuka, Kanagawa (JP); Makoto Toriyama, Kanagawa (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 33 days.

(21) Appl. No.: 17/375,783

(22) Filed: Jul. 14, 2021

(65) Prior Publication Data
US 2022/0294750 A1 Sep. 15, 2022

(30) Foreign Application Priority Data

Mar. 15, 2021 (JP) ................................. 2021-041536

(51) Int. Cl.
| | |
|---|---|
| *H04L 12/58* | (2006.01) |
| *G06F 3/0481* | (2022.01) |
| *G10L 25/63* | (2013.01) |
| *H04L 51/046* | (2022.01) |
| *G06F 3/04817* | (2022.01) |
| *G06F 3/04842* | (2022.01) |
| *G06V 40/16* | (2022.01) |

(52) U.S. Cl.
CPC ........ *H04L 51/046* (2013.01); *G06F 3/04817* (2013.01); *G10L 25/63* (2013.01); *G06F 3/04842* (2013.01); *G06V 40/174* (2022.01)

(58) Field of Classification Search
CPC .............. H04L 51/046; G06F 3/04817; G06F 3/04842; G10L 25/63; G06V 40/174
See application file for complete search history.

(56) References Cited

U.S. PATENT DOCUMENTS

| | | | |
|---|---|---|---|
| 7,343,561 B1* | 3/2008 | Stochosky | G06Q 10/10 715/758 |
| 2009/0271716 A1* | 10/2009 | Jones | G06Q 10/109 715/758 |
| 2014/0157153 A1* | 6/2014 | Yuen | A63F 13/537 715/758 |
| 2021/0142820 A1* | 5/2021 | Rai | G06F 40/30 |
| 2021/0272585 A1* | 9/2021 | Han | G16H 50/70 |

FOREIGN PATENT DOCUMENTS

| | | |
|---|---|---|
| JP | 2014-134895 A | 7/2014 |
| JP | 2019-220221 A | 12/2019 |

* cited by examiner

*Primary Examiner* — Jennifer N Welch
*Assistant Examiner* — Parmanand D Patel
(74) *Attorney, Agent, or Firm* — Oliff PLC

(57) ABSTRACT

An information processing apparatus includes a processor configured to: acquire user data posted in a chat room participated by multiple users; and with multiple display forms changed, display association information that associates at least one piece of information of the user data or response information responsive to the user data with a user having posted the user data and posting time of the user data.

17 Claims, 20 Drawing Sheets

FIG. 3

| BALLOON | | REACTION | ICON EXAMPLES |
|---|---|---|---|
| 12A | TWEET | DENOTING AGREEMENT, EMPATHY, QUESTION, ETC. | 14B, 14A |
| 12B | MEMO | DENOTING ONE'S OWN MEMO, REFLECTION AND DECISION ABOUT ACTION ITEM. | 14D, 14E, 14C |
| 12C | NOTICE | DENOTING STATEMENT OF VERIFICATION. | 14G |
| 12D | ORDINARY POST / REPLY | DENOTING FEELING FOR POSTING, SUCH AS "LIKE", OR REPLY | 14F |
| 12E | URGENT POST / REPLY | DENOTING STATEMENT OF VERIFICATION AND STATUS ABOUT ACTION ITEM | 14C |

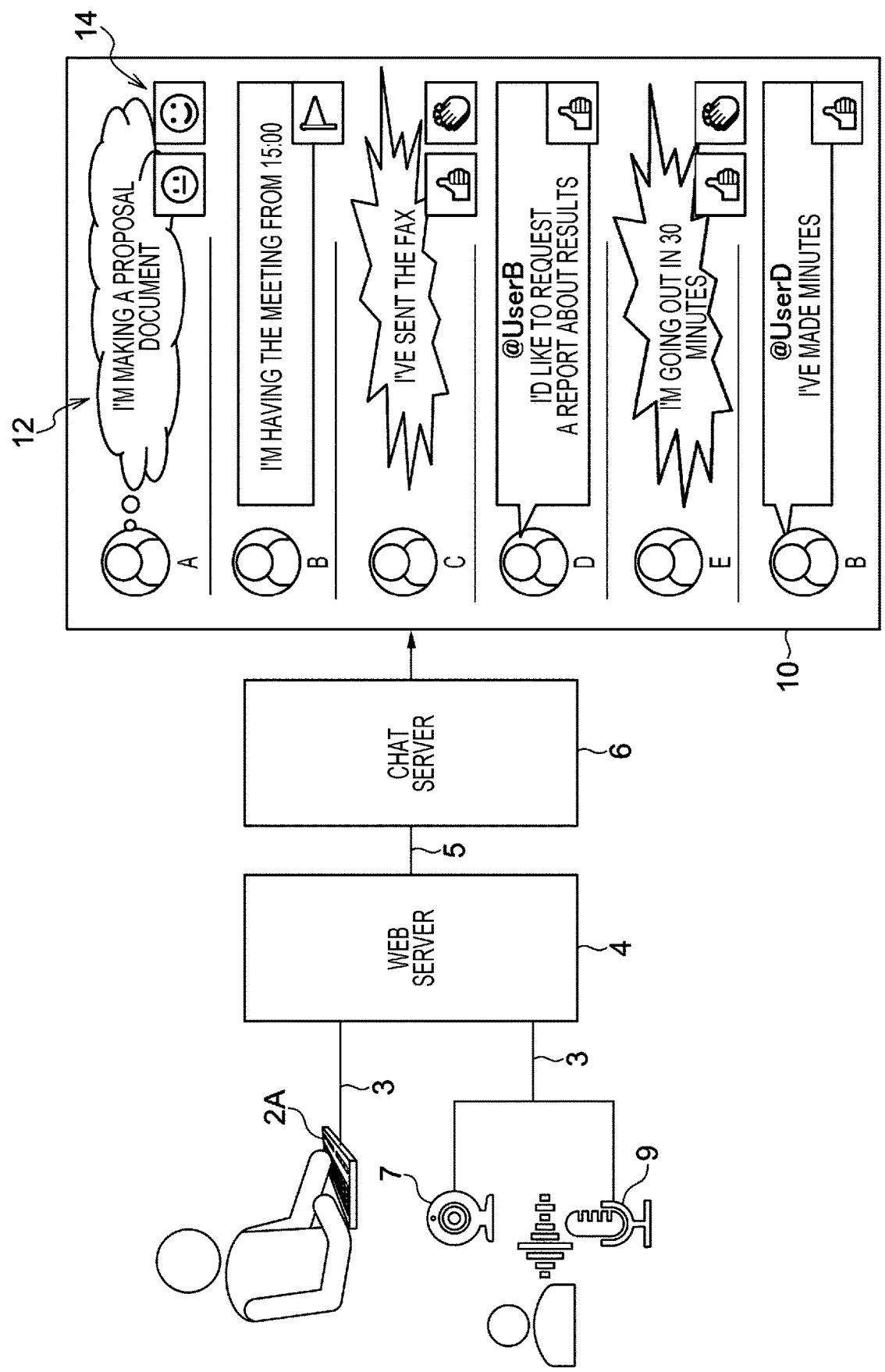

FIG. 6

| DATE | A | B |
|---|---|---|
| 12/1 Tues 9:00 –10:00 | 🎵 I'M MAKING A PROPOSAL DOCUMENT 9:32 | 👥 SALE STRATEGY MEETING 9:30 |
| 12/1 Tues 10:00–11:00 | 👤 THANK YOU 10:08 | 🎵 I'M MAKING A PROPOSAL DOCUMENT 10:01 |
| 12/1 Tues 11:00 –12:00 | 🎵 NETWORK IS NOT STABLE 11:08 | 👥 NEW PRODUCT PLANNING MEETING 11:05 |
| 12/1 Tues 12:00 –13:00 | 🎵 I'M MAKING A PROPOSAL DOCUMENT 12:30 | |

13A 👥 MEETING   13B 🎵 TWEET   13C 👤 CHAT

FIG. 9A

| VOICE NUANCE | VOICE POINT |
|---|---|
| TWEET | 3 |
| APPEAL | 4 |
| URGENT | 1 |
| BUSINESSLIKE | 0 |

FIG. 9B

| FACIAL EXPRESSION NUANCE | FACIAL EXPRESSION POINT |
|---|---|
| POSITIVE | 1 |
| NEUTRAL | 4 |
| NEGATIVE | 0 |

FIG. 9C

| BALLOON | BALLOON POINT |
|---|---|
| TWEET | 8 |
| MEMO | 6 |
| NOTICE | 1 |
| REGULAR POST / REPLY | 5 |
| URGENT POST / REPLY | 0 |

FIG. 17

| DATE | A | B | C |
|---|---|---|---|
| 12/1 Tues 9:00 –10:00 | 🎵 I'M MAKING A PROPOSAL DOCUMENT 9:32 | 🎦 SALE STRATEGY MEETING 9:30 | |
| 12/1 Tues 10:00–11:00 | 😊 THANK YOU 10:08 | 🎵 I'M MAKING A PROPOSAL DOCUMENT 10:01 | 😊 I'VE SENT THE FAX 10:07 |
| 12/1 Tues 11:00 –12:00 | 🎵 NETWORK IS NOT STABLE 11:08 | | |
| 12/1 Tues 12:00 –13:00 | 🎵 I'M MAKING A PROPOSAL DOCUMENT 12:30 | | 😊 HOW MANY COPIES OF THE MATERIAL DO YOU WANT TO PRINT? 12:30 |
| 12/1 Tues 13:00 –14:00 | 🎦 WEB MEETING 13:00 | | |
| 12/1 Tues 14:00 –15:00 | 😊 TELL ME ABOUT THE OPERATION 14:29 | 😊 I'M GOING OUT IN 30 MINUTES 14:30 | 🎵 I'M MAKING A PROPOSAL DOCUMENT 14:20 |
| 12/1 Tues 15:00 –16:00 | 🎦 SALES PLANNING MEETING 16:05 | OFF | 🎦 NEW PRODUCT PLANNING MEETING 15:10 |
| 12/1 Tues 16:00 –17:00 | | OFF | 🎵 IT'S NO OVERTIME DAY TODAY AND SO I'M GOING HOME AT 17:00 16:45 |
| 12/1 Tues 17:00 –18:00 | 🎵 I'M MAKING MINUTES OF THE PREVIOUS MEETING 17:15 | OFF | OFF |

🎦 MEETING  🎵 TWEET  😊 CHAT
  13A        13B        13C

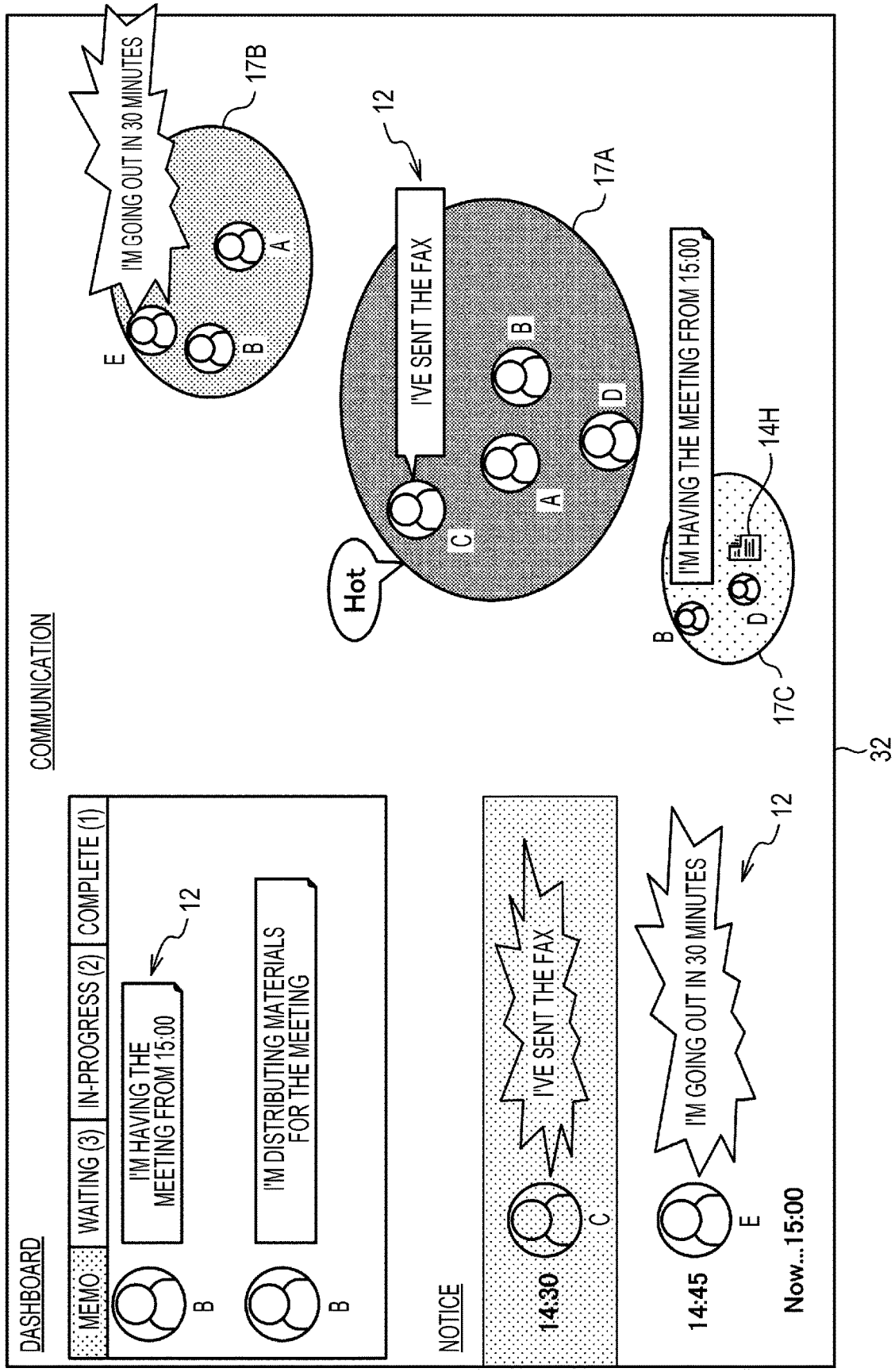

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-041536 filed Mar. 15, 2021.

BACKGROUND

(i) Technical Field

The present disclosure relates to an information processing apparatus, information processing method, and non-transitory computer readable medium.

(ii) Related Art

Japanese Unexamined Patent Application Publication No. 2019-220221 discloses an information processing system that is connected to multiple terminal devices and receives a messages from one terminal device and transmits the received message to another terminal device. The information processing system includes a check unit that performs spelling check of the message received from the terminal device and a transmitting unit that, if a spelling mistake is detected by the check unit, transmits a message with the mistake corrected to the other terminal.

Japanese Unexamined Patent Application Publication No. 2014-134895 discloses a program that visualizes the feature of data and causes a computer to execute a series of operations. The operations include an operation of acquiring data that is labeled based on at least one variable, an operation of generating a feature vector using the variable of the acquired data as a parameter, an operation of mapping the generated feature vector in a multidimensional space, and an operation of displaying the mapped feature vector on a screen.

With the spread of telework, users at remote places may communicate with each other using groupware through chatting.

Conversations using user data of characters are displayed in a time sequence in a chat room. A user who participates in the middle of a chat session may read in retrospect the conversation posted in the chat room in order to understand the contents of the conversation going on in the chat room. Multiple topics may go on in parallel in the chat room. It may be sometimes difficult to know which conversation is related to which topic and who is participating in the current topic.

SUMMARY

Aspects of non-limiting embodiments of the present disclosure relate to providing an information processing apparatus and non-transitory computer readable medium allowing a user to understand the communication status of each user from the user data posted in the chat room.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire user data posted in a chat room participated by multiple users; and with multiple display forms changed, display association information that associates at least one piece of information of the user data or response information responsive to the user data with a user having posted the user data and posting time of the user data.

BRIEF DESCRIPTION OF THE DRAWINGS

Exemplary embodiment of the present disclosure will be described in detail based on the following figures, wherein:

FIG. 3 illustrates examples of balloons and icons;

FIG. 4 schematically illustrates an estimation method of the balloon;

FIG. 6 illustrates an example of a history view;

FIGS. 9A through 9C illustrate how the nuances of a user are converted into a point;

FIG. 17 illustrates an example of a history view;

FIG. 20 illustrates a display example on an overhead view of a desktop computer.

DETAILED DESCRIPTION

Figure 1:
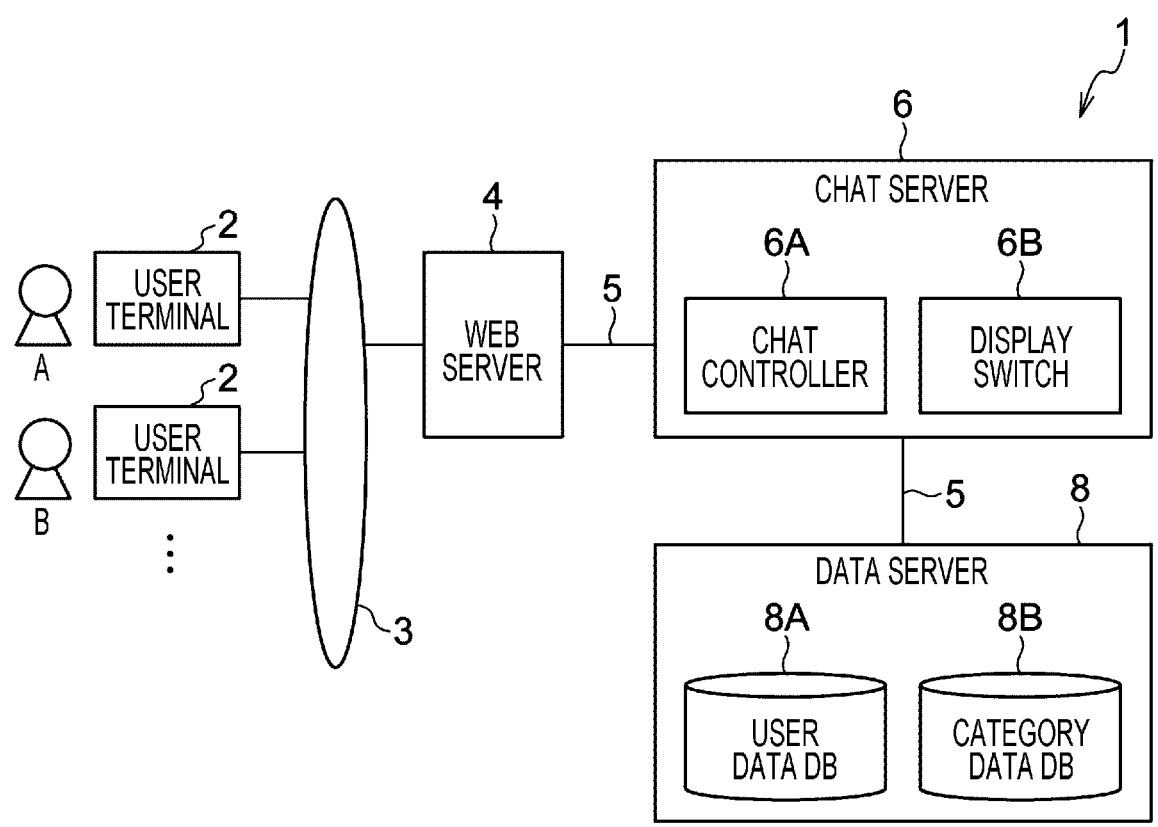
FIG. 1 illustrates an example of an information processing system.

An exemplary embodiment of the disclosure is described below with reference to the drawings. Like elements are designated with the same reference numerals throughout the drawings and the description thereof is not duplicated.

FIG. 1 illustrates an example of an information processing system 1 of the exemplary embodiment. Referring to FIG. 1, the information processing system 1 includes a web server 4, chat server 6, and data server 8. The web server 4, chat server 6, and data server 8 are interconnected to each other via a local area network (LAN) 5. Via the web server 4 connected to the Internet 3, the information processing system 1 provides a chat service to a user terminal 2 of each user connected to the Internet 3.

The "chat" signifies that users converse, tweet, make a request, make a notice, fill in a memorandum, or report on a real-time basis by using characters or image in order to convey information. The information processing system 1 provides to each user a location for chatting, for example, a "chat room 10." Information posted in the chat room 10 is shared by the users participating in the chat room 10 via the user terminals 2. The information each user posts to the chat room 10 via the user terminal 2 is hereinafter referred to as "user data."

The web server 4 receives the user data from each user terminal 2, notifies the chat server 6 of the user data, and transmits to the user terminal 2 an information screen that is used to notify the user of the status of a communication performed in the chat room 10.

After receiving the user data from the web server 4, the chat server 6 serving as an example of an information processing apparatus generates association information. The association information associates at least one piece of information selected from the group consisting of the user data and response information posted in the chat room 10 in response to the user data with a user having posted the user data and posting time of the user data. The association information is a generic term representing the status of the communication performed in the chat room 10. The chat server 6 having that function includes a chat controller 6A and display switch 6B.

The chat controller 6A performs a process related to the management of the chat room 10 and the generation of the association information. Specifically, by controlling the display switch 6B, the chat controller 6A generates the association information in a display form specified by the user from the user data posted in the chat room 10 and delivers to the user terminal 2 via the web server 4 the information screen that displays the generated association information in the specified display form.

Figure 2:
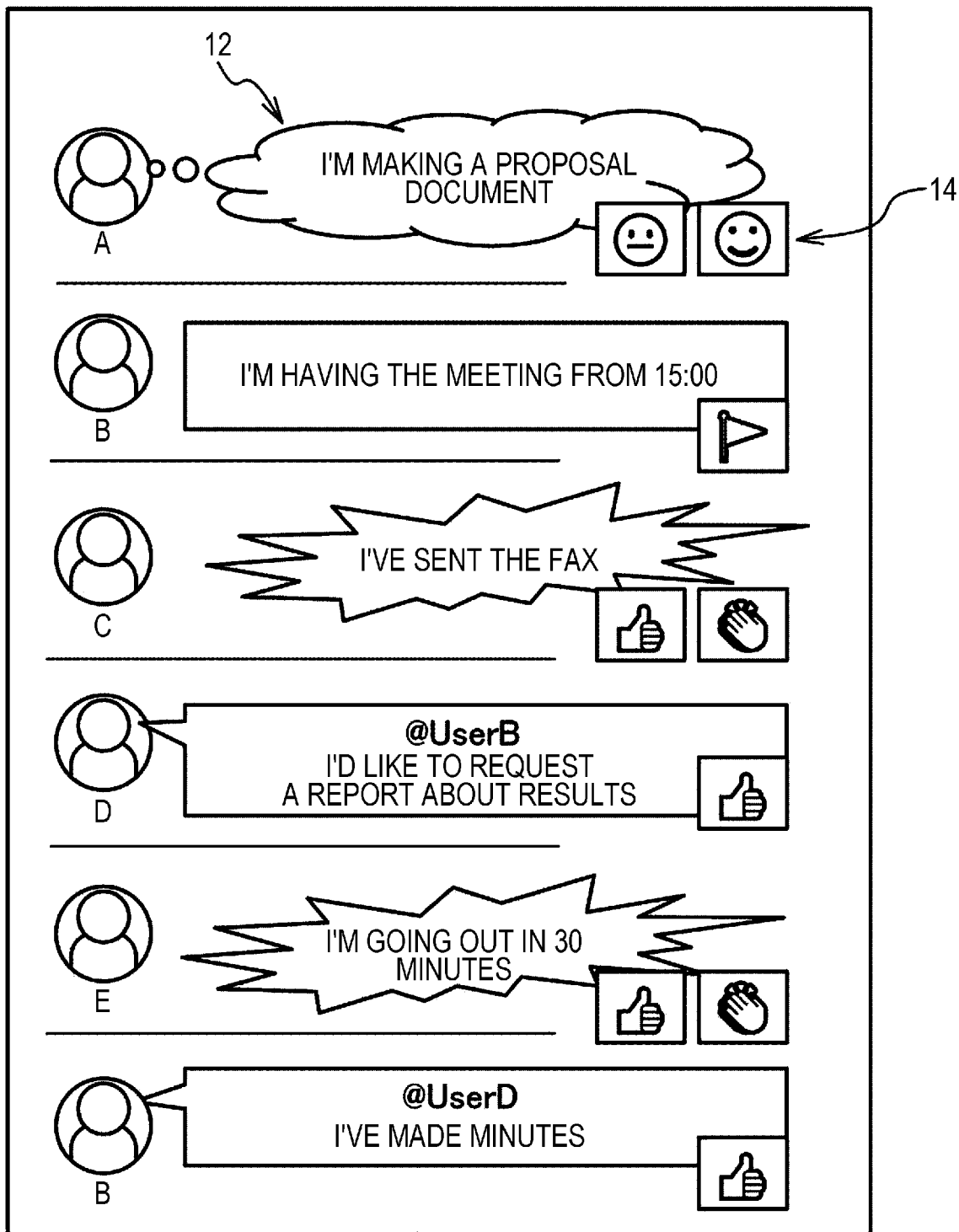
FIG. 2 illustrates an example of a chat room.

FIG. 2 illustrates an example of the chat room 10. The user data associated with the users of the user data is displayed in the order of posting from top to bottom in the chat room 10. Specifically, the chat room 10 is an example of the display form that displays the association information.

The user data posted in the chat room 10 is enclosed in a balloon 12. The balloon 12 is associated with information representing the feeling or the psychological state of the user who has posted the user data, namely with feeling information. If users talk to each other in person, one user may recognize the facial expression and the loudness and pitch of the voice of another user, and the feeling and psychological state of the other user having spoken from the speaking rate. However, it is difficult to recognize the facial expression and the feeling of the voice of a speaking person via chatting in in the chat room 10. A user participating in the chat room 10 may recognize via the balloon 12 the feeling and psychological state of the user that would be difficult to recognize via only the contents of the user data posted in the chat room 10. The feeling and psychological state that would be difficult to recognize via only the contents of the user data posted in the chat room 10 are hereinafter referred to as a "nuance."

FIG. 3 illustrates an example of the balloons 12 used in the chat room 10. The balloons 12 include a balloon 12A for tweeting, balloon 12B for memo, balloon 12C for notice, balloon 12D for ordinary post and reply, and balloon 12E for urgent post and reply.

The balloon 12A for tweeting is used to represent a remark that does not assume a particular response from any other user. Specifically, the balloon 12A is used for the user data that is posted as a monologue in the chat room 10. The user data displayed in the balloon 12A is hereinafter simply referred to as a "tweet."

The balloon 12B for memo is used for the user data posted as a memorandum for a user himself or herself in the chat room 10. The user data displayed in the balloon 12B may also hereinafter be referred to as a "memo."

The balloon 12C for notice is used for the user data posted as a notice to participants in the chat room 10. The user data displayed in the balloon 12C may also hereinafter be referred to as a "notice."

The balloon 12D for an ordinary post and reply is used for the user data that is none of the memorandum and notice to other users. The user data displayed in the balloon 12D may also hereinafter be referred to as an "ordinary post and reply."

The balloon 12E for urgent post and reply is used for the user data that is to be urgently notified to other users or involves an urgent response. The user data displayed in the balloon 12E may also hereinafter be referred to as an "urgent post and reply."

If the balloon 12A through the balloon 12E are not distinguished one from another, they are collectively referred to the balloon 12.

Referring to FIG. 3, the variety of balloons 12 correspond to respective icons 14. The chat controller 6A controls the display switch 6B (see FIG. 2) such that the balloon 12 with the icon 14 associated beforehand therewith is displayed in the chat room 10.

A user participating in the chat room 10 may select the icon 14 displayed together with the user data in the chat room 10 and may thus post in the chat room 10 the feeling of the user associated beforehand with the icon 14 as a response to the user data. Specifically, the user having posted the user data is free from indicating to the chat server 6 the icon 14 displayed together with the user data. In response to the type of the balloon 12 associated with the user data, the chat controller 6A displays in the chat room 10 the icon 14 together with the user data with the icon 14 associated with the feeling information autonomously represented by the balloon 12.

The balloon 12A for tweet is associated with the icon 14 that represents an ambiguous consent, empathy, or question. Specifically, an icon 14A is selected when an ambiguous question arises in response to a tweet and an icon 14B is selected when an ambiguous consent or empathy responds to the tweet.

The balloon 12B for memo is associated with the icon 14 that indicates a user's own memo of the user having posted the user data, and reflection and decision to an action item in the memo. Specifically, an icon 14C is selected when the contents of the memo are an action item (also referred to as "ToDo item"). An icon 14D is selected when an action item has been started with any activity. An icon 14E is selected when an action item is complete. The icon 14C is also referred to as an "action item 14C." The icon 14D is also referred to as a "started icon 14D." The icon 14E is referred to as a "complete icon 14E."

The balloon 12C for notice is associated with the icon 14 that indicates the confirmation of the contents of the notice. Specifically, an icon 14F is selected to express the statement of the agreement with the contents of the notice (such as "like") and an icon 14G is selected to express the statement of the positive agreement with the contents of the notice.

The balloon 12D for ordinary post and reply is associated with the icon 14F that expresses a feeling for the post and reply, such as "like." The balloon 12E for urgent post and reply is associated with the icon 14F that confirms the contents of the post or reply and the statement of the agreement with the contents of the post and reply and is also associated with the icon 14C that expresses reflection in the action item.

If the icons 14A through 14G are not distinguished one from another, they are collectively referred to the icon 14. The icons 14 associated with the variety of balloons 12 in FIG. 3 are described for exemplary purposes only. The chat controller 6A may change, delete, or add icons 14 associated with the balloons 12 in response to a user instruction.

The reply to the user data and user reaction that is reflected in the user data with the icon 14 selected are examples of response information to the user data.

FIG. 4 schematically illustrates an estimation method of the balloon 12. FIG. 4 indicates the types of the balloon 12 the chat controller 6A uses to display the user data in the chat room 10.

When the user data is posted in the chat room 10 as illustrated in FIG. 4, the user uses an input device 2A, such as a keyboard or touch panel on the user terminal 2, to specify and transmit the user's own nuance together with the user data from the user terminal 2 to the chat server 6 via the web server 4. Specifically, when the user data is displayed in characters, the chat controller 6A identifies the balloon 12 of the user data to be displayed in the chat room 10 in accordance with the nuance specified by the user.

The user data to be transmitted from the user terminal 2 to the chat server 6 may be voice instead of the characters. In such a case, the voice the user has spoken to a microphone 9 is converted into voice data on the user terminal 2 and then transmitted to the chat server 6 via the web server 4.

The chat controller 6A converts and then displays the user data represented by the voice into the user data represented by characters while estimating the user nuance from the acquired voice.

If the user terminal 2 is connected to a camera 7, the user may photograph with the camera 7 the facial expression of the user who is speaking the voice to the microphone 9 and transmit the image from the camera 7 (hereinafter referred to as a "user image") together with the voice to the chat server 6 via the web server 4. In such a case, the chat controller 6A estimates the nuance of the user from the voice and user image.

The nuance of the user having posted the user data may be estimated from the voice alone. In the discussion that follows, the chat controller 6A assumes that the nuance of the user is estimated using the voice and user image. The estimation method of the user nuance using the voice and user image is described in detail below.

The display switch 6B in the chat server 6 in FIG. 1 generates an information screen that displays the association information in the display form responsive to an instruction from the chat controller 6A.

The data server 8 stores data related to the chat room 10 and the association information.

The chat server 6 stores, in association with the chat room 10, the user data from the user terminal 2 on the user data database (DB) 8A in the data server 8. The chat server 6 also categorizes according to the display form the association information responsive to the display form and stores the categorized association information on the category data DB 8B in the data server 8. The chat server 6 and data server 8 may be integrated into a unitary module.

The display form of the association information described heretofore includes an overhead view 16 and history view 18.

Figure 5:
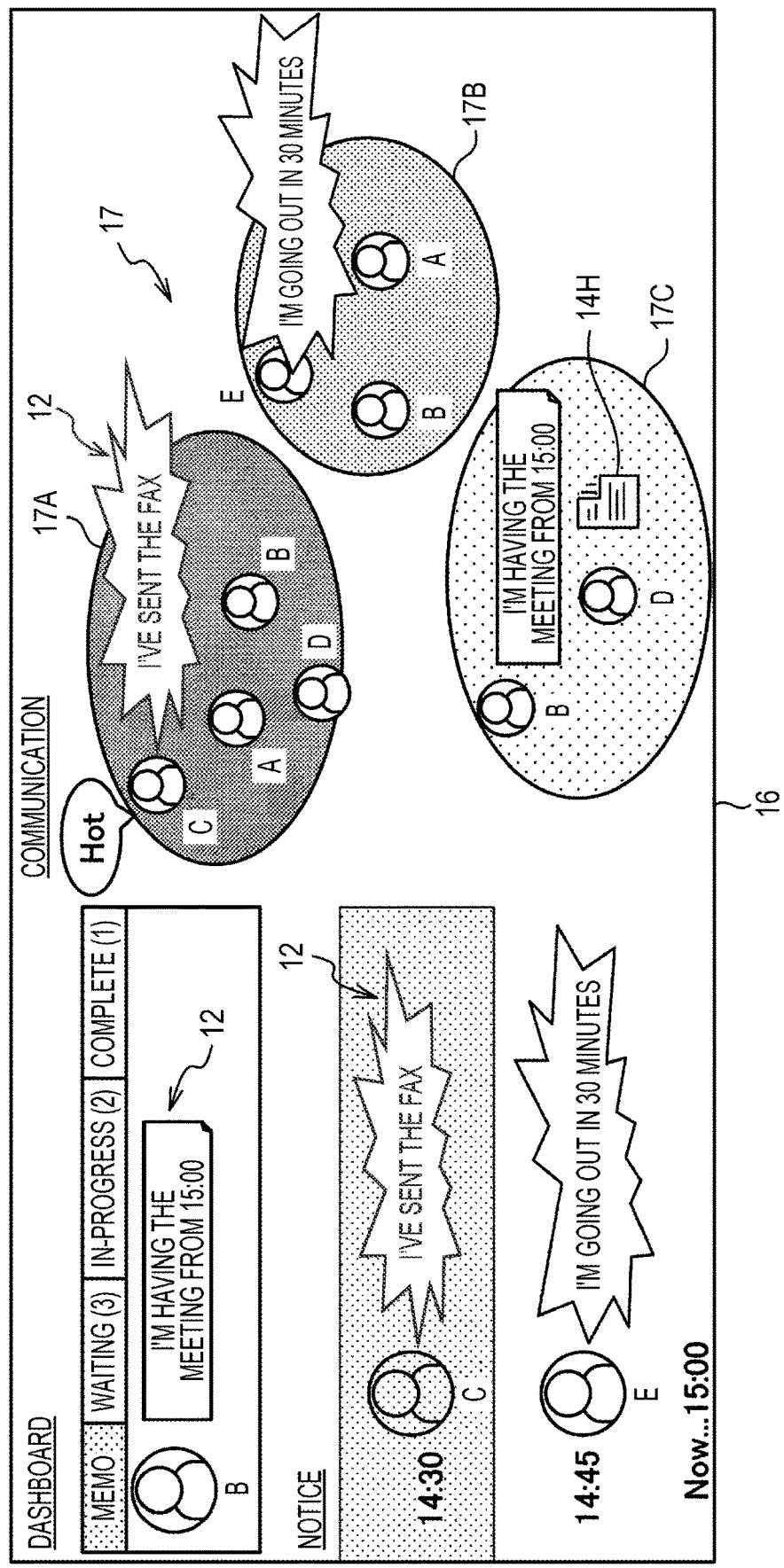
FIG. 5 illustrates an example of an overhead view.

FIG. 5 is an example of the overhead view 16. The overhead view 16 is an example of the information screen. Pieces of the user data posted in the chat room 10 are categorized into multiple categories according to at least one piece of information selected from the group consisting of the type of balloon 12 representing the user nuance and the response information responsive to the user data. The information screen displays the association information in a display form that is different from category to category. Specifically, the pieces of the user data are categorized according to at least one piece of information selected from the group consisting of the type of the balloon 12 used to display the user data, the amount of posts of the user data, the type and amount of posts of the response information responsive to the user data, posting time intervals and posting time of the user data and the response information, attribute of a user who has posted the user data and the response information, contents of a file posted together with the user data, and user data to which the response information has been responded. The overhead view 16 displays the categorized association information in a display form different from category to category.

As illustrated in the overhead view 16 in FIG. 5, the user data posted in the chat room 10 is categorized into three categories, namely, "dashboard," "notice," and "communication" and the status of the communication performed in the chat room 10 is displayed in the display form different from category to category.

Depending on the selection status of the action icon 14C, the started icon 14D, and the complete icon 14E, the memo posted in the chat room 10 is categorized into a mere memo and a memo involving an action item in the dashboard in the overhead view 16. If the memo involves an action item, the memo is further categorized according to the progress status of the action item and then displayed.

The notices in the overhead view 16 are those posted in the chat room 10 and displayed together.

In the overhead view 16, a series of response information responsive to common user data serving as a starting point and posted in the chat room 10 is grouped as a group 17 together with the common user data, thus forming a single communication. The series of response information and the common user data are displayed with the display form of each group 17 varied in view of the degree of response of the response information responsive to the user data serving as the starting point.

For convenience of explanation, a display area of the dashboard in the overhead view 16 is referred to as a "dashboard region," a display area of the notice is referred to as a "notice region," and a display area of the communication is referred to as a "communication region."

The degree of response of the response information is an index representing the degree of climax of the chat. For example, the degree of response is higher, or in other words, the chat is more climaxed as the number of posts of the response information per unit time is higher or as the number of users having posted the response information is higher. Referring to FIG. 5, the user data posted in the chat room 10 is grouped into three groups 17, namely, groups 17A through 17C in the communication region. A "hot" label is attached to the group 17A in which chatting is performed at the degree of response higher than a predetermined value.

The icon 14H representing a file is displayed in the group 17C. The user may post in the chat room 10 the user data with a file attached thereto. When the user data with the file attached thereto is displayed, the icon 14H is displayed to indicate the attachment of the file.

FIG. 6 illustrates an example of the history view 18. The user data posted in the chat room 10 is extracted under a condition specified by the user. The history view 18 is an example of the information screen that displays the association information on each user by using the extracted user data.

Referring to FIG. 6, the status of communication of person A and person B on the date specified by the user is categorized according to the time band and displayed in the history view 18. Marks 13 displayed in the history view 18 are additional information that visually displays the communication status on a per user basis and on a per time band basis. For example, a mark 13A indicates that the user is at a meeting. A mark 13B indicates that the user has posted a tweet in the chat room 10. A mark 13C indicates that the user has posted user data other than tweet in the chat room 10 and is chatting with another user.

A determination as to whether the user is at the meeting may be made by the chat controller 6A when the chat controller 6A acquires a schedule for each user from a schedule server (not illustrated). In addition to the user data posed in the chat room 10, the history view 18 may display a variety of information on users, including the schedule of each user participating in the chat room 10, operating status of each user terminal 2, and attendance information on each user. Specifically, action history of each user including the communication status of the user may be recognized in the history view 18.

A time band outside working hours of the user is displayed in a display form different from a time band within the working hours. A user may not be available to communicate with another user in the chat room 10, for example, the user terminal 2 is not switched on or the user has not logged in on the user terminal 2. The time band in which the user is not available is denoted "OFF." In the history view 18 in FIG. 6, the time band outside the working hours is grayed out. The history view 18 thus indicates that person B is off duty in the time band 12:00-13:00 on December 1.

Gray-out is an example of display form. In the gray-out, a particular location (the frame indicating the time band herein) is made gray in color at a level that still keeps displayed contents visible. Alternatively, the particular location may also be filled with a color different from gray.

The user data, schedule of the user, operating status of the user terminal 2, and attendance information on the user are examples of information used to display the history view 18. The information used to display the history view 18 is referred to as "history information."

The condition the user may specify about the displaying of the history view 18 is not limited to the date. The user may specify in the history view 18 at least one piece of information selected from the group consisting of a user name, length of the time band, type of the history information to be displayed, and background color of the display area of each time band that changes depending on the type of the history information displayed.

In response to an instruction from each user, the chat controller 6A displays either the overhead view 16 or history view 18 by switching between the overhead view 16 and history view 18 on each user terminal 2. In response to an instruction from a user, the chat controller 6A displays on the user terminal 2 at least two views together selected from the group including the chat room 10, overhead view 16, and history view 18. The overhead view 16 and history view 18 are examples of the category that displays the categorized user data in a different display form.

Figure 7:
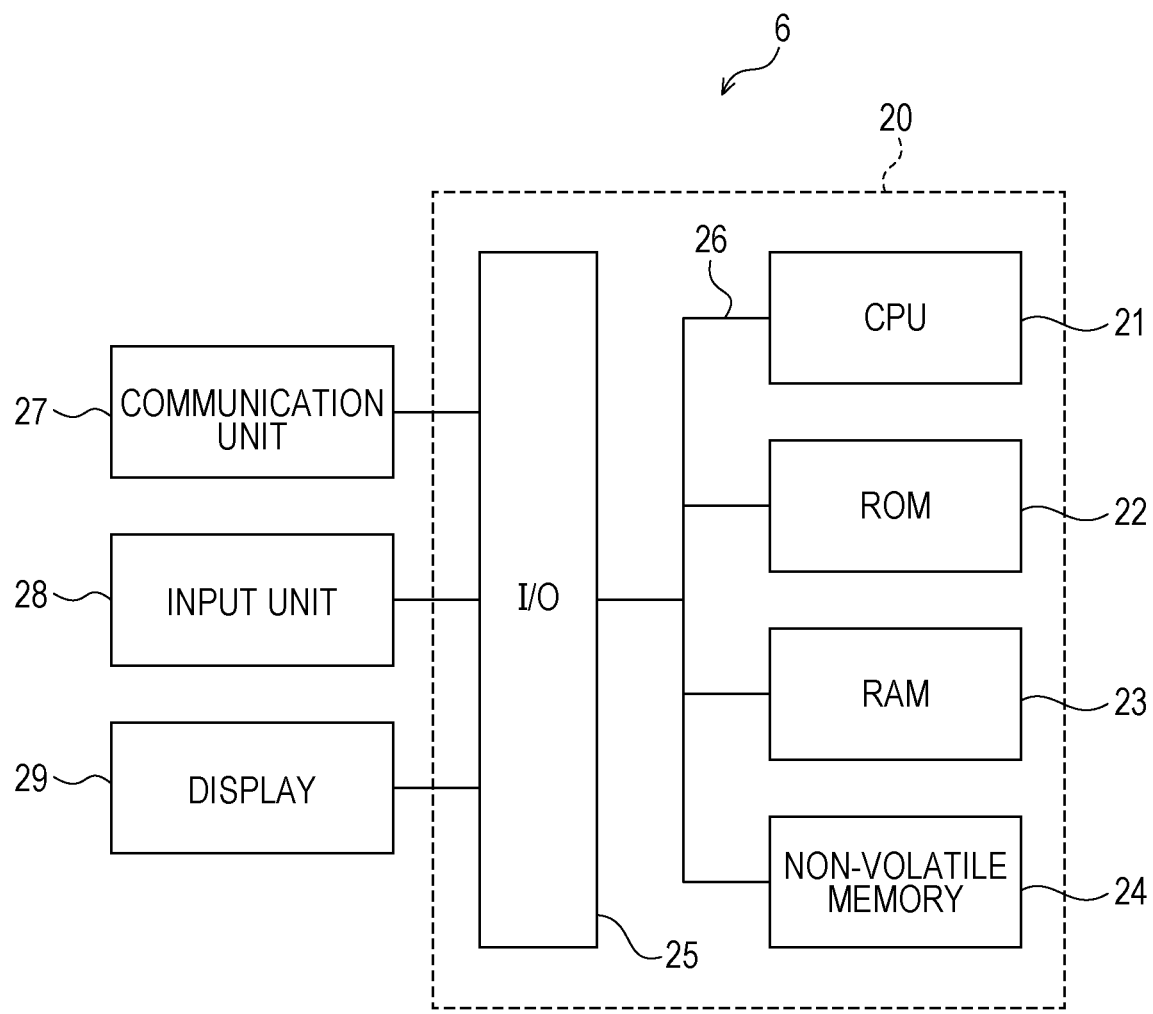
FIG. 7 illustrates a configuration of a computer used as a chat server.

The chat server 6 in FIG. 1 includes a computer 20. FIG. 7 illustrates a configuration of the chat server 6 including the computer 20.

The computer 20 includes a central processing unit (CPU) 21 serving as an example of a processor implementing the functions of the chat server 6 in FIG. 1, read-only memory (ROM) 22 storing an information processing program causing the computer 20 to function as the chat server 6, random-access memory (RAM) 23 used as a temporary working area for the CPU 21, non-volatile memory 24, and input and output (I/O) interface 25. The CPU 21, ROM 22, RAM 23, non-volatile memory 24, and I/O interface 25 are interconnected to each other via a bus 26.

The non-volatile memory 24 is an example of a storage device that keeps storing information even if power to the non-volatile memory 24 is interrupted. The non-volatile memory 24 is typically a semiconductor memory or alternatively may be a hard disk. The non-volatile memory 24 stores a parameter, such as a threshold value, which may be referenced when the CPU 21 executes the information processing program.

The I/O interface 25 is connected to a communication unit 27, input unit 28, and display 29.

The communication unit 27 is connected to the LAN 5. The communication unit 27 performs data communication with the user terminal 2 via the web server 4 and supports a communication protocol for data communication with the data server 8.

The input unit 28 receives an instruction from an operator of the chat server 6 and notifies the CPU 21 of the instruction. A button, touch panel, keyboard, pointing device, and/or mouse may be used for the input unit 28.

The display 29 visually outputs information processed by the CPU 21. A display device, such as a liquid-crystal display, organic electroluminescent (EL) display, or projector projecting a video on a screen, may be used for the display 29.

Since the chat server 6 may be remotely operated via the Internet 3, the input unit 28 and display 29 may not necessarily be employed for the computer 20.

Referring to FIG. 4, the user may post the user data in the chat room 10. The estimation process of the user nuance performed in this case is described below.

Figure 8:
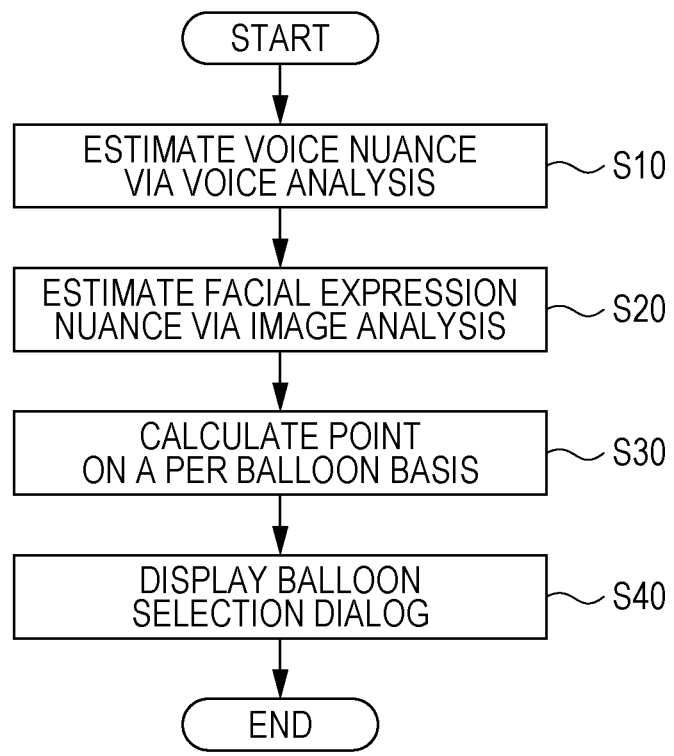
FIG. 8 is a flowchart illustrating a nuance estimation process that uses user data represented as voice.

FIG. 8 is a flowchart illustrating the nuance estimation process performed by the CPU 21 in the chat server 6 when the chat server 6 receives the user data as the voice from the user terminal 2 via the web server 4.

The information processing program defining the nuance estimation process is pre-stored on the ROM 22 in the chat server 6. The CPU 21 in the chat server 6 reads the information processing program from the ROM 22 and executes the nuance estimation process.

As previously described, the user data as the voice is attached with a user image photographed by the camera 7.

In step S10, the CPU 21 analyzes the voice as the user data using a related-art voice analysis technique to convert the user data as the voice into characters and estimates the nuance of the user. The nuance of the user estimated from the voice are referred to as "voice nuance."

The CPU 21 converts the certainty of the voice nuance obtained from the user data into a point on each type of predetermined voice nuance and sets the point for each type.

FIGS. 9A through 9C illustrate the nuance estimation process that estimates the nuance of the user using the point. FIG. 9A illustrates how the voice nuance is converted into a point.

Referring to FIG. 9A, the predetermined types of voice nuances include "tweet," "appeal," "urgent," and "businesslike," and the CPU 21 sets a point for each type of voice nuance. As a voice nuance has a higher point, that voice nuance represents a higher probability that the feeling of the user appears in the user data as the voice. The point set for the voice nuance is referred to as a "voice point."

As an example, the voice nuances are categorized into four types "tweet," "appeal," "urgent," and "businesslike." Alternatively, for example, the voice nuances may be categorized into other types, such as "calmness" and "emotional."

In step S20, using a related-art image analysis technique, the CPU 21 analyzes the user image attached to the user data and estimates the user nuance. The user nuance estimated from the user image is referred to as a "facial expression nuance."

The CPU 21 converts the certainty of the facial expression nuance obtained from the user data into a point on each type of predetermined facial expression nuances and sets the point for each type. FIG. 9B illustrates how a facial expression nuance is converted into a point.

Referring to FIG. 9B, the predetermined types of facial expression nuances include "positive," "neutral," and "negative," and the CPU 21 sets a point for each type of facial expression nuances. As a facial expression nuance has a higher point, that facial expression nuance represents a higher probability that the feeling of the user appears in the user image. The point set for the facial expression nuance is referred to as a "facial expression point."

As an example, the facial expression nuances are categorized into three types "positive," "neutral," and "negative." Alternatively, for example, the facial expression nuances may be categorized into other types, such as "questionable" and "indifferent."

In step S30, the CPU 21 calculates the point for each type of the balloon 12 by using the voice point of the voice nuance set in step S10 and the facial expression point for each type of the facial expression nuance set in step S20. For example, the CPU 21 calculates a balloon point for each type of the balloon 12 by using a predetermined evaluation function. In the predetermined evaluation function, the voice point for each type of the voice nuance and the facial expression point for each type of the facial expression nuance serve as an explanatory variable and the point for each type of the balloon 12 (hereinafter referred to as a "balloon point") serves as an objective variable.

FIG. 9C illustrates how the balloon 12 is converted into a point. A balloon point is set for each type of balloon 12. Referring to FIG. 9C, the CPU 21 selects the balloon 12B used for a memo having the highest balloon point as a candidate for the balloon 12 used for the user data.

Specifically, the CPU 21 estimates the user nuance by combining the voice nuance of the user estimated from the voice and the facial expression nuance of the user estimated from the user image.

In step S40, the CPU 21 generates a balloon selection dialog box 11 displaying the candidate for the balloon 12 used to display the user data and displays the generated balloon selection dialog box 11 on the user terminal 2 that has transmitted the user data as the voice.

Figure 10:
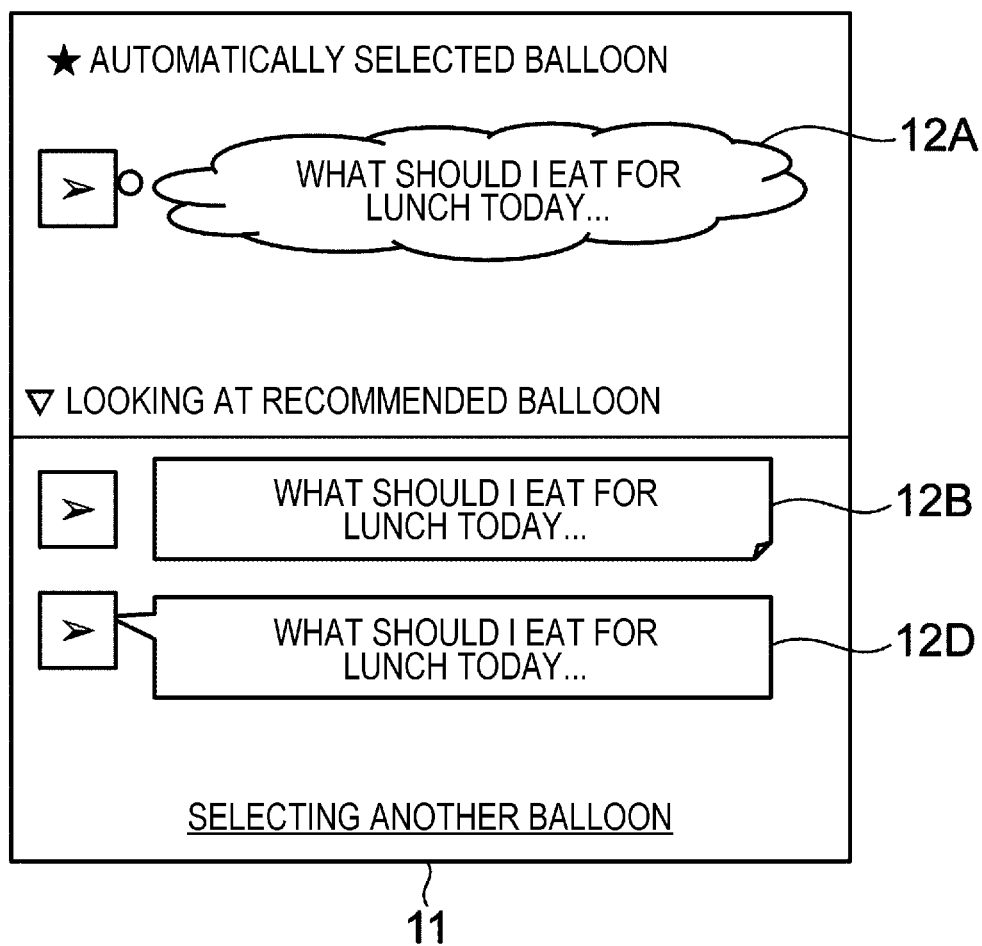
FIG. 10 illustrates an example of a balloon selection dialog.

FIG. 10 illustrates an example of the balloon selection dialog box 11. The user data converted into characters is displayed in the balloon 12 having the highest balloon point and selected in step S30 in the column for "Automatically selected balloon" in the balloon selection dialog box 11. In the column "Looking at recommended balloon" in the balloon selection dialog box 11, the user data converted into characters is displayed in the balloon 12 that is other than the balloon 12 displayed in the column "Automatically selected balloon" and has a balloon point higher than a predetermined threshold.

The user who has posted the user data by the voice selects the balloon 12 most correctly expressing his or her own feeling from the candidates for the balloon 12 displayed in the balloon selection dialog box 11. Upon receiving the selection results of the balloon 12 from the user terminal 2 via the balloon selection dialog box 11, the CPU 21 displays the user data converted in characters in the selected balloon 12 in the chat room 10.

The CPU 21 displays an item "Selecting another balloon" in the balloon selection dialog box 11. If the item is selected by the user, the CPU 21 displays all other balloons 12 that are not displayed in the balloon selection dialog box 11 such that the user may select one of the other balloons 12.

The voice analysis in step S10 in FIG. 8, for example, may determine that the user data includes multiple different nuances where there is a tendency that a tweet made first is followed by an appeal.

In such a case, the CPU 21 may segment the user data at a transition where the nuances change, and may select a candidate for the balloon 12 reflecting the nuance for each piece of the segmented user data. In the chat room 10, the pieces of user data segmented by the CPU 21 are displayed in the balloons 12 respectively associated with the user nuances estimated from the segmented pieces of user data.

The CPU 21 may determine the transition of nuances by using at least one piece of information selected from the group consisting of a change in the frequency and volume of the voice. Alternatively, the CPU 21 may determine as the transition of nuances a location where the voice is interrupted or as the transition of nuances a silent duration that is between a voice and another voice and is longer than a predetermined time. The silent duration is shorter than a predetermined threshold that is used to determine whether the voice is spoken or not.

For example, if an expression, such as "By the way" or "That reminds me," is used in the middle of a conversation, the user nuance may change together with a change of subject. By analyzing the change of the frequency of the voice, the CPU 21 may identify a location of the voice where words corresponding to such expression are spoken and determine the location as a change of the nuance. Specifically, when the words corresponding to the expression are spoken, the CPU 21 identifies the location of the voice where the expression is spoken, by comparing the voice of the user with the frequency data of the voice stored on the non-volatile memory 24.

The user data may be segmented at a location that is not intended by the user. The CPU 21 may receive a correct segmentation location from the user, re-segment the user data at the segmentation location specified by the user, and display the segmented user data in the chat room 10.

The CPU 21 may receive the user data, such as the user data represented by characters and not segmented by the user, re-segment the user data at the location specified by the user, and display again the re-segmented user data in the chat room 10. Even after the user data is displayed in the chat room 10, the CPU 21 may receive from the user a change instruction to the balloon 12 concerning specific user data and change to the type of the user-specified balloon 12 of the user data specified by the user.

As previously described, the nuance estimation process is performed when the voice as the user data is received from the user terminal 2. The CPU 21 may perform the nuance estimation process on the user data represented by characters even when the nuance is not specified by the user.

Figure 11:
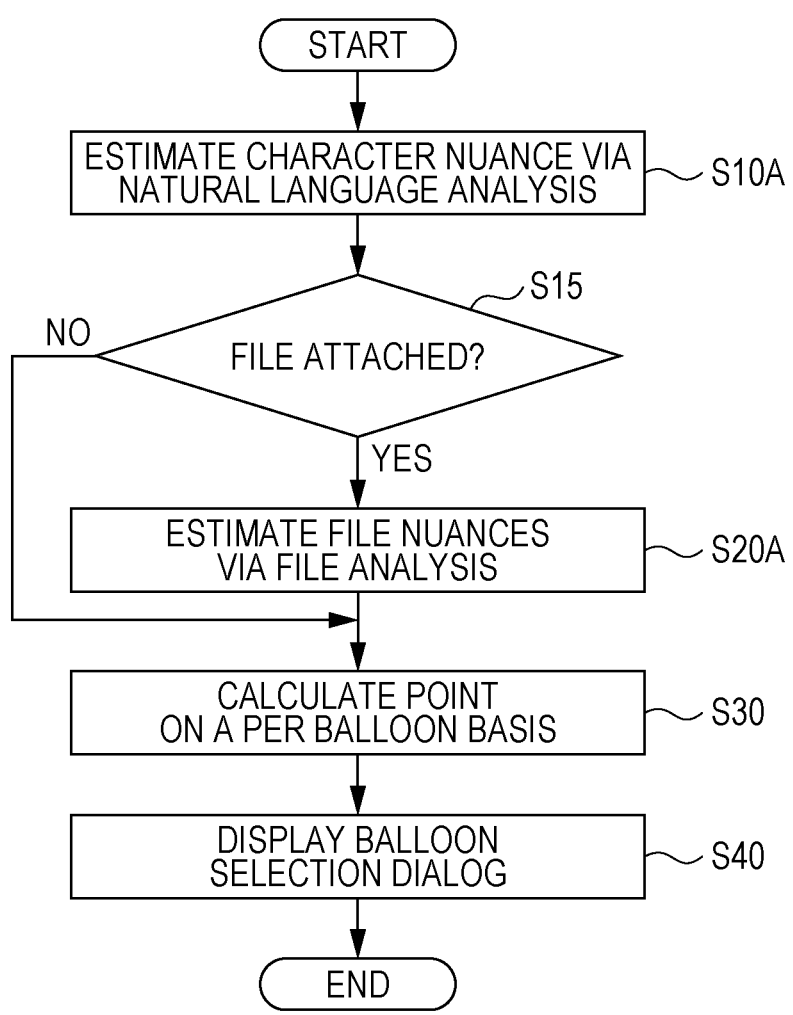
FIG. 11 is a flowchart illustrating an example of a nuance estimation process that uses the user data represented by characters.

FIG. 11 illustrates an example of the nuance estimation process performed on the user data represented by characters. The difference between the flowchart in FIG. 11 between the flowchart of the nuance estimation process performed on the user data represented by voice in FIG. 8 is that steps S10A and 20A respectively replaces steps S10 and S20 and step S15 is newly added in FIG. 11.

In step S10A, the CPU 21 analyzes the context of the user data via a relate-art natural language analysis technique and estimates the user nuance. The user nuance estimated from the context of the user data is referred to a "character nuance."

The CPU 21 converts the certainty of the character nuance obtained from the user data into a point on each type of the predetermined character nuance and sets the point for the character nuance. The point set for the character nuance is referred to as a character point.

In step S15, the CPU 21 determines whether the user data is attached with a file. If the user data is attached with a file, the CPU 21 proceeds to step S20A.

In step S20A, the CPU 21 analyzes the contents of the file and estimates the user nuance. The user nuance estimated from the file is referred to as a "file nuance."

The CPU 21 converts the certainty of the file nuance obtained from the file into a point on each type of the predetermined file nuance and sets the point for the certainty of the file nuance. The point set for the file nuance is referred to as a "file point".

If the file is a meeting material, the CPU 21 determines that the file is businesslike. If the file includes a message reading "Please contact me as soon as possible," the CPU 21 determines the file is urgent. If the file is a mere background image, the CPU 21 determines that the file is a tweet. If the file is a photo of a person, the CPU 21 may estimate the nuance of the user from the facial expression of the person photographed.

On the other hand, if the CPU 21 determines in a determination operation in step S15 that the user data is not attached with a file, the CPU 21 proceeds to step S30 without performing the operation in step S20A.

In the process in FIG. 8, the CPU 21 calculates the balloon point on each type of the balloons 12 in accordance with the character point on each type of the character nuance set in step S10A and the file point, if present, on each type of the file nuance set in step S20A. The CPU 21 displays on the user terminal 2 the balloon selection dialog box 11 that displays a candidate for the balloon 12 used to display the user data.

Based on the context of the user data represented by characters and the contents of the file attached to the user data, the CPU 21 may present to the user the candidate for the balloon 12 that reflects the user nuance.

In the nuance estimation processes illustrated in FIGS. 8 and 11, the CPU 21 causes the user to select the balloon 12 for use by displaying in the balloon selection dialog box 11 the candidates for the balloon 12 that are used to display the user data. Without the user selecting the balloon 12, the CPU 21 displays in the chat room 10 the user data by using the balloon 12 having the highest balloon point. A determination as to whether to allow the user to select the balloon 12 may be set in a selectable manner.

A display example of the overhead view 16 is described below.

Figure 12:
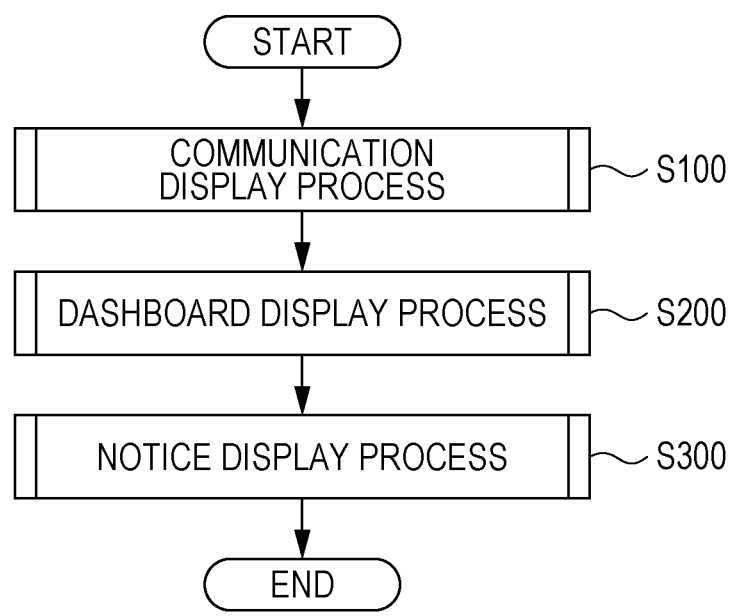
FIG. 12 is a flowchart illustrating an overhead view display process.

FIG. 12 is a flowchart illustrating of an overhead view display process that is performed by the CPU 21 in the chat server 6, for example, when the chat server 6 receives a display instruction of the overhead view 16 from the user terminal 2 via the web server 4.

The information processing program defining the overhead view display process is pre-stored, for example, on the ROM 22 in the chat server 6. The CPU 21 in the chat server 6 reads the information processing program from the ROM 22 and executes the overhead view display process.

In step S100, the CPU 21 performs a communication display process that displays in the communication region the status of the communication performed in the chat room 10.

In step S200, the CPU 21 performs a dashboard display process that display, in the dashboard region, information concerning a memo posted in the chat room 10.

In step S300, the CPU 21 performs a notice display process that displays, in the notice region, information concerning a notice posted in the chat room 10.

Figure 13:
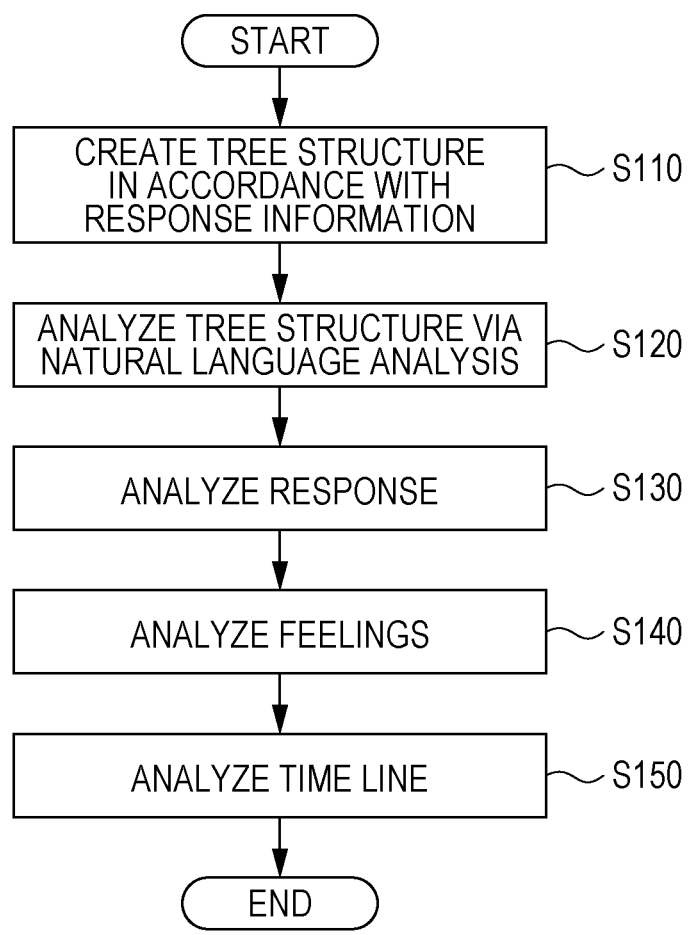
FIG. 13 is a flowchart illustrating an example of a communication display process.

FIG. 13 is a flowchart illustrating in detail the communication display process performed in step S100 in FIG. 12.

In step S110, the CPU 21 keeps track of the response information responsive to the user data posted in the chat room 10 in accordance with association relationship of the response information and generates a tree structure having as a root the user data that serves as a starting point leading to a series of response information. Each element of the tree structure forms an independent group 17 in each communication region.

If the response information is a reply, the association relationship of the response information may be tracked by referencing a destination user name of the reply written in the format "@user name." If the response information is a reaction of a user as a result of selecting the icon 14, the association relationship of the response information may be tracked by referencing the user data associated with the selected icon 14.

Some user data seems a mere tweet or memo and does not indicate a user reaction to the original user data and but is actually response information to another piece of the user data. Such user data does not specify association relationship with the other piece of data. Since such user data is not included in the tree structure generated in step S110, the tree structure does not correctly reflect the status of the communication performed in the chat room 10.

In step S120, the CPU 21 analyzes the context of the user data via a related art natural language technique. Even if user data is not clear in the association relationship with the other piece of the user data, the CPU 21 performs a tree structure analysis by detecting the user data serving as the response information to the other piece of the user data in view of the context and including the detected user data in the tree structure.

In step S130, the CPU 21 performs response analysis on the response information in each group 17 and changes the display form of each group 17 in accordance with the degree of response of the response information represented by at least one piece of information selected from the group consisting of the amount of posts of the response information and the number of users having posted the response information.

The display of the hot label for the group 17A in FIG. 5 is an example of the change of the display form responsive to the degree of response.

Furthermore, the CPU 21 may display a display area of one group 17 in a larger size than the display areas of the other groups 17 as the one group 17 has a higher degree of response or may display one group 17 more closer to the center of the communication region than the other groups 17 as the one group 17 has a higher degree of response. In response to the degree of response, the CPU 21 may change the font of the characters used to display the group 17 or may change the background color of the display area of the group 17, response information, or the color and size of the characters used to display the user data serving as the starting point.

In step S140, the CPU 21 performs feeling analysis on the response information in each group 17 via the related-art natural language analysis technique and changes the display form of each group 17 depending on the number of agreements or disagreements.

If the number of disagreements to the proposal of the user data serving as a starting point is larger, the CPU 21 displays "no" for the group 17. If the number of agreements to the proposal of the user data is larger, the CPU 21 displays "yes" for the group 17. The CPU 21 may display as a value a ratio of the number of disagreements to the number of agreements, change the font of the characters used to display the group 17 in accordance with the ratio of the number of disagreements to the number of agreements, or change the background color of the display area of the group 17 and the color and size of the characters of the user data.

The CPU 21 may change the display position of each group 17 in the communication region in response to the ratio of the number of disagreements to the number of agreements. For example, the CPU 21 displays a group 17 having the number of agreements larger than the number of disagreements to the left of the center line of the communication region while displaying a group 17 having the number of disagreements larger than the number of agreements to the right of the center line of the communication region.

In step S150, the CPU 21 performs time line analysis on the response information of each group 17. The CPU 21 then changes the display form of each group 17 in accordance with the degree of response of the response information represented by at least one piece of information selected from the group consisting of a posting time interval of the response information, posting frequency per unit time of the response information, posting time of the response information, and time elapse from the posting of the last response information.

The CPU 21 may display the response information in a larger size in the group 17 as the response information is more recently posted. As a group 17 has a higher posting frequency of the response information per unit time, the CPU 21 may set the display area of the group 17 to be larger than the display areas of the other groups 17. If a group 17 has a higher posting frequency of the response information per unit time, the CPU 21 may change the background color of the display area of the group 17, the response information, and the color and size of the characters displaying the user data serving as the starting point.

The CPU 21 may display in the group 17 the time band having the largest number of posted pieces of response information by using at least one piece of information selected from the group consisting of the characters, symbols, drawings, and colors.

The CPU 21 displays the user name of a user having posted the user data and response information, and avatar or user icon representing the user (hereinafter referred to as "user information") together with the user data and response information in the group 17. The user information is an example of an attribute of the user.

The communication display process in FIG. 13 has been described. Through the communication display process, the CPU 21 categorizes communications performed in the chat room 10 according to subject and displays the categorized communications. The user may thus learn the degree of climax of chats on a per subject basis.

Figure 14:
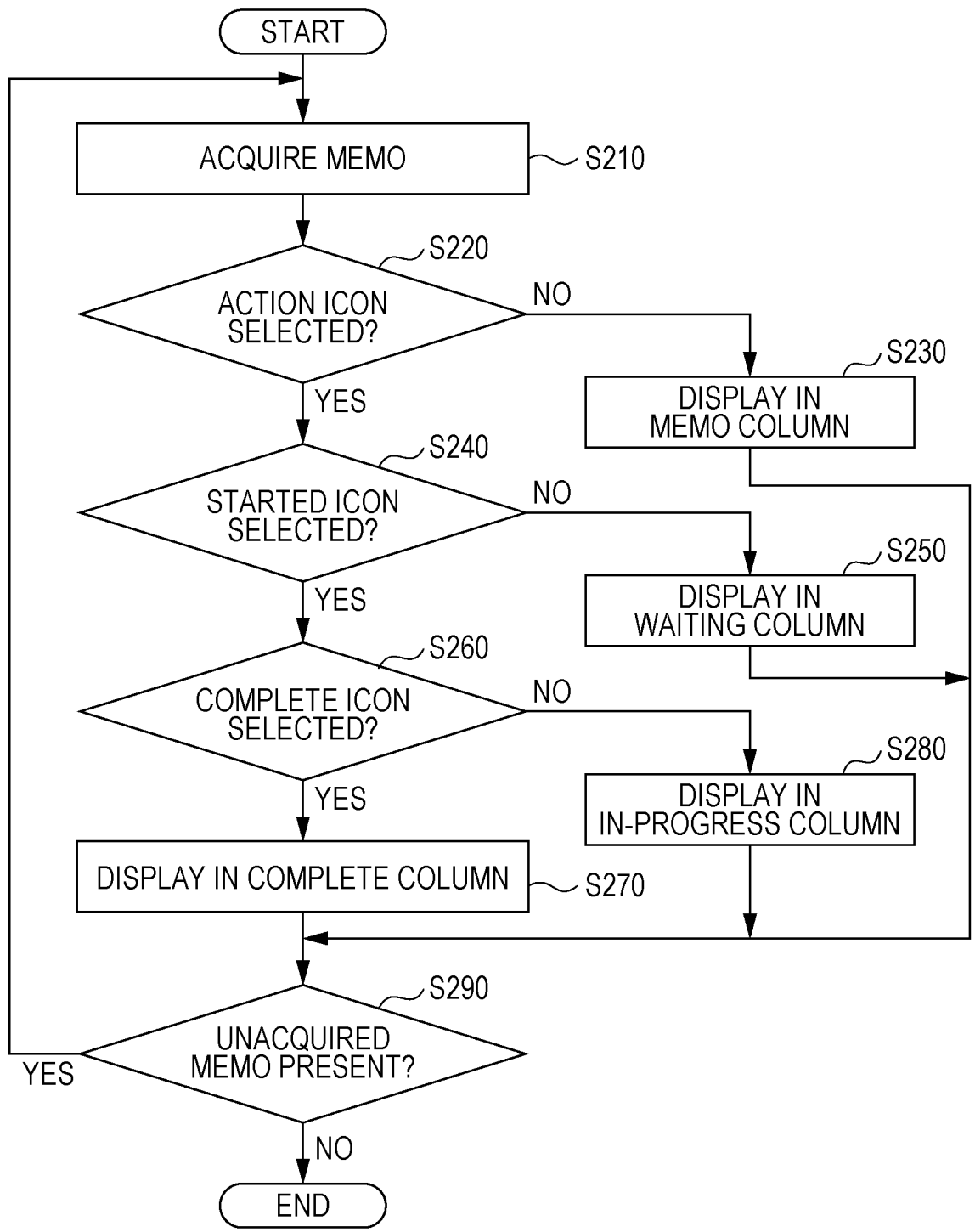
FIG. 14 is a flowchart illustrating an example of a dashboard display process.

FIG. 14 is a flowchart illustrating in detail the dashboard display process performed in step S200 in FIG. 12.

In step S210, the CPU 21 acquires one of memos posted in the chat room 10.

In step S220, the CPU 21 determines whether the action icon 14C is selected for the memo acquired in step S210 (hereinafter referred to as the "acquired memo"). If the action icon 14C is not selected, the CPU 21 proceeds to step S230.

In this case, the acquired memo is a mere memo and not an action item. In step S230, the CPU 21 displays, in an associated form, the acquired memo and the user information on the user having posted the acquired memo in a memo column in the dashboard region.

If the CPU 21 determines in the determination operation in step S220 that the icon 14C is selected, the CPU 21 proceeds to step S240.

In step S240, the CPU 21 determines whether the started icon 14D is selected for the acquired memo. If the started icon 14D is not selected, the CPU 21 proceeds to step S250.

Although the acquired memo is a memo with an action item in this case, the user has not taken any action. In step S250, the CPU 21 displays, in association with the acquired memo, the user information on the user having posted the acquired memo in a waiting column of the dashboard region.

On the other hand, if the CPU 21 determines in the determination operation in step S240 that the started icon 14D is selected, the CPU 21 proceeds to step S260.

In step S260, the CPU 21 determines whether the complete icon 14E is selected for the acquired memo. If the complete icon 14E is selected, the CPU 21 proceeds to step S270.

In this case, the action item represented by the acquired memo has been performed. In step S270, the CPU 21 displays, in association with the acquired memo, the user information on the user having posted the acquired memo in a complete column of the dashboard region.

On the other hand, if the CPU 21 determines in the determination operation in step S260 that the complete icon 14E is not selected, the process proceeds to step S280.

In this case, the action item represented by the acquired memo has been started by the user but is not yet complete. In step S280, the CPU 21 displays, in association with the acquired memo, the user information on the user having posted the acquired memo in an in-progress column of the dashboard region.

Since the acquired memo and the user information on the user having posted the acquired memo are displayed in one of the columns of the dashboard region, the CPU 21 determines in step S290 whether an unacquired memo is present in the chat room 10. If an unacquired memo is present, the process returns to step S210 where the CPU 21 acquires one of the unacquired memos as a newly acquired memo. Specifically, the CPU 21 iterates steps S210 through S290 until the CPU 21 determines in the determination operation in step S290 that any unacquired memo is no longer present in the chat room 10. The CPU 21 thus categorizes each of the memos posted in the chat room 10 into one of the columns of the dashboard region and displays the categorized memos.

If the CPU 21 determines in the determination operation in step S290 that no unacquired memo is present in the chat room 10, the CPU 21 completes the dashboard display process in FIG. 14.

Through the dashboard display process, the CPU 21 categorizes the memos into mere memos and memos with an action item in the dashboard region of the overhead view 16 as illustrated in FIG. 5 and categorizes the memos with the action items into "waiting," "in-progress," and "complete." Numbers respectively attached to "waiting," "in-progress," and "complete" tags represent the number of memos categorized into the column of each action item.

Figure 15:
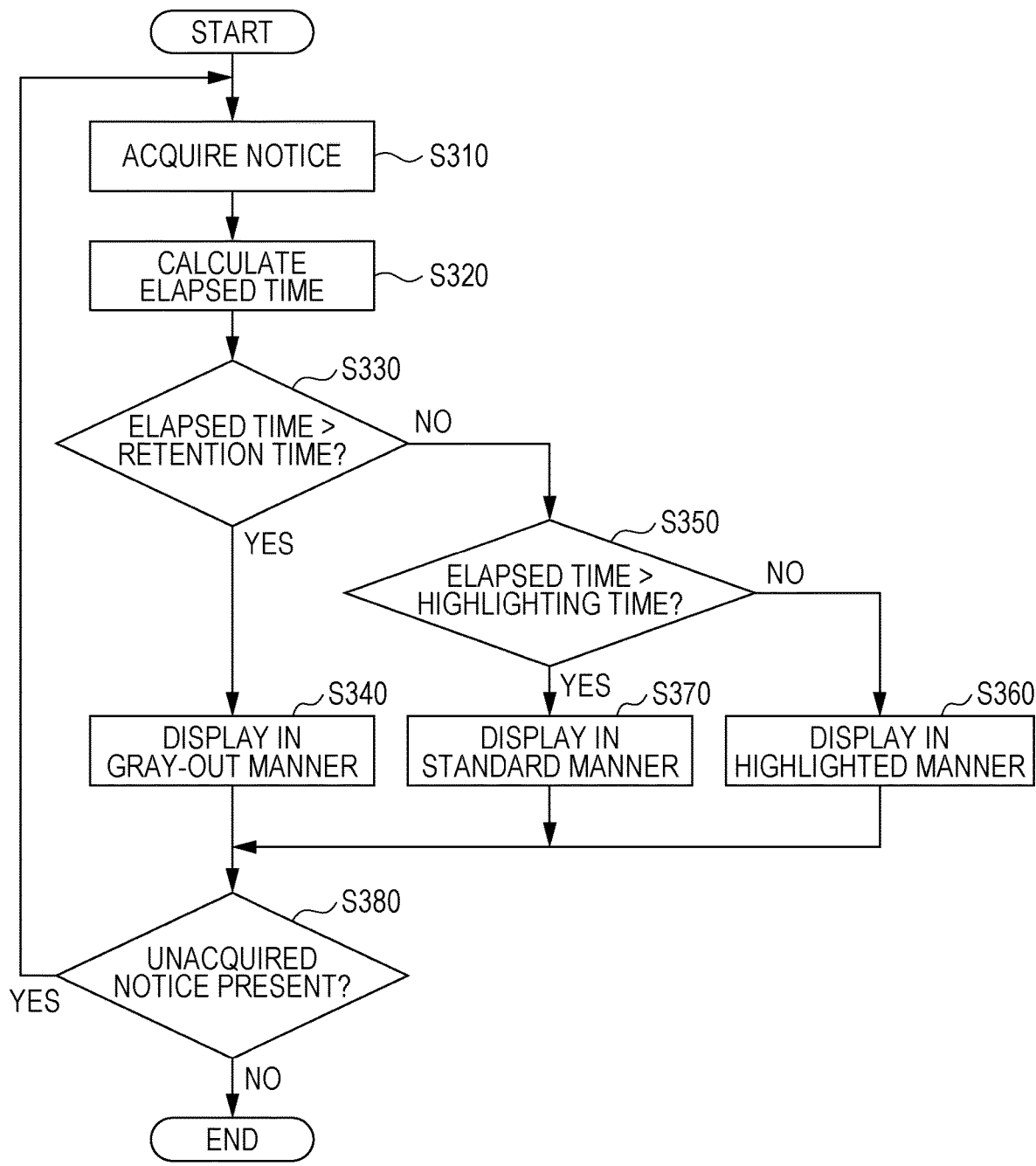
FIG. 15 is a flowchart illustrating an example of a notice display process.

FIG. 15 is a flowchart illustrating the notice display process in step S300 in FIG. 12.

In step S310, the CPU 21 acquires one of notices posted in the chat room 10.

In step S320, the CPU 21 acquires execution start time of the notice display process (hereinafter referred to as "present time"), calculates elapsed time that is a difference between the present time and the posting time when the notice acquired in step S310 is posted in the chat room 10, and stores the calculated time on the RAM 23. The CPU 21 acquires the present time from a clock built in the CPU 21 but alternatively may acquire the present time from a time server (not illustrated) connected to the Internet 3.

In step S330, the CPU 21 retrieves the elapsed time from the RAM 23 and determines whether the elapsed time exceeds retention time. The retention time is utilized to determine the display form of the acquired notice in accordance with the length of the elapsed time and is stored beforehand, for example, on the non-volatile memory 24. If the elapsed time is longer than the retention time, information notified by the acquired notice is of lower value. For example, the information notified by the acquired notice is of lower value because too much time has passed since the posting of the acquired notice in the chat room 10 and the start time of a meeting notified by the acquired notice has passed.

If the elapsed time is longer than the retention time, the process proceeds to step S340. In step S340, the CPU 21 grays out and displays the acquired notice in the notice region in FIG. 5 such that the acquired notice is less noticeable than the other notices.

If the CPU 21 determines in the determination operation in step S330 that the elapsed time is equal to or shorter than the retention time, the process proceeds to step S350.

In step S350, the CPU 21 determines whether the elapsed time exceeds highlighting time. The highlighting time, like the retention time, is utilized to determine the display form of the acquired notice in accordance with the length of the elapsed time and is stored beforehand, for example, on the non-volatile memory 24. The retention time and the highlighting time are related as the retention time>the highlighting time. The retention time and highlighting time may be modified by the user. If the elapsed time is equal to or shorter than the highlighting time, information notified by the acquired notice is still of higher value. For example, the information notified by the acquired notice is still of higher value because not too much time has passed since the posting of the acquired notice in the chat room 10 and a meeting notified by the acquired notice is going to held and the user may want to make the meeting to be widely known.

If the elapsed time is equal to or shorter than the highlighting time, the process proceeds to step S360. In step S360, the CPU 21 displays the acquired notice in a highlighted manner in the notice region such that the acquired notice is more noticeable than the other notices in the notice region. The acquired notice displayed in a highlighted manner signifies that the characters of the acquired notice is set to be larger in size than the characters of the other notices, the color of the characters of the acquired notice is changed, the thickness of the font of the characters of the acquired notice is changed, the background color of the acquired notice is changed, the font of the characters of the acquired notice is changed, or the word "IMPORTANT" or image to attract attention of users is attached to the acquired notice.

On the other hand, if the CPU 21 determines in the determination operation in step S350 that the elapsed time exceeds the highlighting time, the process proceeds to step S370. In such a case, the acquired notice is not displayed in a more highlighted manner than the other notices but is not old enough to be displayed in a gray-out manner.

In step S370, the CPU 21 displays the acquired notice in a predetermined standard display form in the notice region. The standard display form signifies a display form in the middle between being less noticeable than the highlighted display of the acquired notice in step S360 and being more noticeable than the gray-out display of the acquired notice in step S340.

After displaying the acquired notice in the notice region of the overhead view 16 in step S340, S360, or S370, the CPU 21 determines in step S380 whether an unacquired notice is present in the chat room 10. If an unacquired notice is present in the chat room 10, the process returns to step S310 where the CPU 21 acquires one of the unacquired notices as a newly acquired notice. Specifically, the CPU 21 iterates steps S310 through S380 until the CPU 21 determines in the determination operation in step S380 that no unacquired notice is present any longer. The CPU 21 thus displays each notice posted in the chat room 10 in the elapsed-time dependent display form in the notice region.

If the CPU 21 determines in the determination operation in step S380 that no unacquired notice is present any longer in the chat room 10, the notice display process in FIG. 15 ends.

In step S340 in FIG. 15, the acquired notice is grayed out to make the acquired notice less noticeable than the other notices. Alternatively, the acquired notice may be hidden in the notice region.

The user data posted in the chat room 10 is displayed in a different display form in the dashboard region, notice region, and communication region of the overhead view 16 and the overhead view display process in FIG. 12 thus ends.

A display example of the history view 18 is described below.

Figure 16:
FIG. 16 illustrates a display example on a bulletin-board type chat room.

FIG. 16 illustrates a display example into which the chat room 10 ("standard style chat room 10") in FIG. 2 is changed in response to an instruction from the user. The chat room 10 in FIG. 16 is a bulletin-board style chat room 10 that displays the user data without using the balloon 12. The bulletin-board style chat room 10 displays the user data in a timetable that partitions the user data with frames and is thus simpler than the standard style chat room 10 that involves displaying the balloons 12 and the icons 14 in addition to the user data. The user may thus recognize the status of the communication focusing on only the user data. In response to an instruction from the user, the CPU 21 switches between the standard style chat room 10 and the bulletin-board style chat room 10. The chat room 10 is also an example of category to display the association information in a different display form.

The standard style chat room 10 includes a button 10A. If the user has selected the button 10A on the user terminal 2, the CPU 21 displays the history view 18 in FIG. 17 on the user terminal 2 that has selected the button 10A. In order to display the history view 18, the display form of the chat room 10 is not necessarily switched to the bulletin-board type. For example, the history view 18 may be displayed from the standard style chat room 10 by causing the button 10A to be displayed on the standard style chat room 10. When the button 10A is selected, the CPU 21 may switch the standard style or bulletin-board style chat room 10 to the history view 18 to display the history view 18 or may display the standard style or bulletin-board style chat room 10 together with the history view 18.

Figure 18:
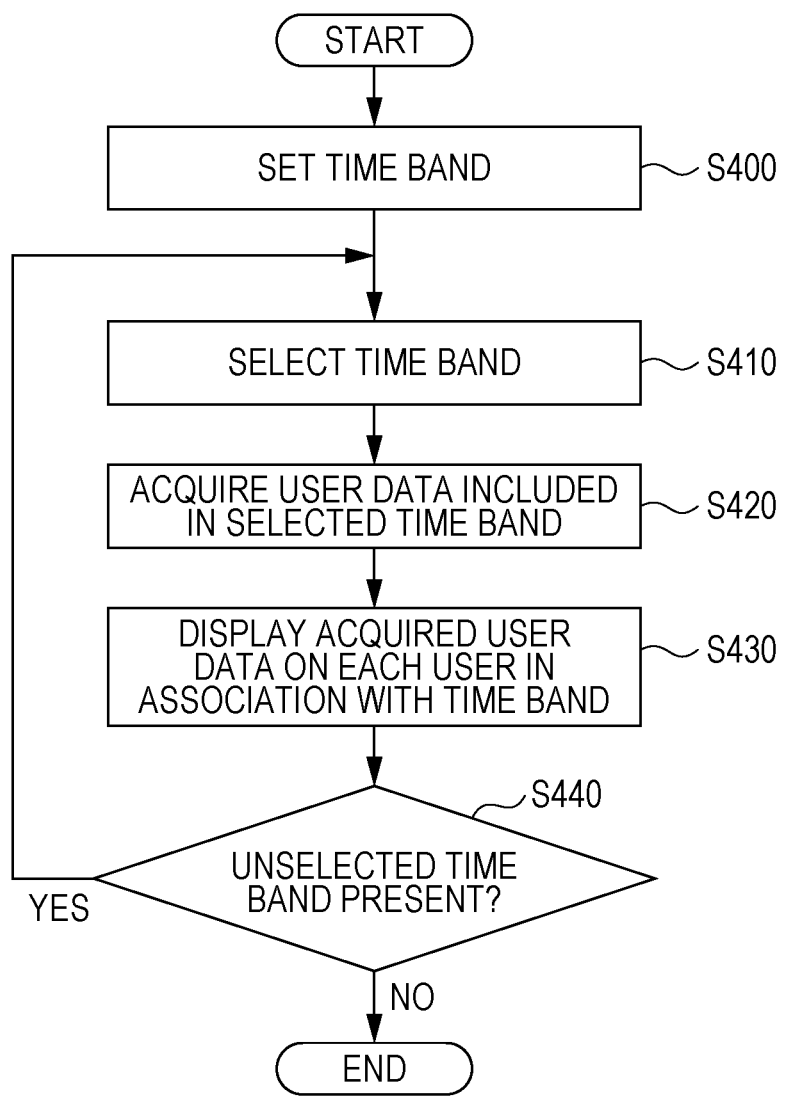
FIG. 18 is a flowchart illustrating an example of a history view display process.

FIG. 18 is a flowchart illustrating a history view display process performed by the CPU 21 in the chat server 6, for example, when the chat server 6 receives a display instruction of the history view 18 from the user terminal 2 via the web server 4.

The information processing program defining the history view display process is pre-stored, for example, on the ROM 22 in the chat server 6. The CPU 21 in the chat server 6 reads the information processing program from the ROM 22 and executes the history view display process.

In a display example described below, the user specifies a particular date as an extraction condition for the user data, and the CPU 21 categorizes the communication status in the chat room 10 on the particular date according to specified time (for example, every hour), and displays the categorized communication status in the history view 18.

In step S400, the CPU 21 segments the specified date according to the time specified by the user, for example, every hour to set a time band of one hour. Specifically, the time bands may be set every hour, for example, 9:00-10:00 and 10:00-11:00.

In step S410, the CPU 21 selects one time band from the time bands set in step S400. The time band selected is referred to as a "selected time band."

In step S420, the CPU 21 acquires on each user participating in the chat room 10 history information including the user data with the posting time thereof falling within the selected time band.

In step S430, the CPU 21 displays, in association with the selected time band, the history information on each user acquired in step S420 on the user terminal 2.

The CPU 21 displays a mark 13 on each piece of the history information in accordance with the type of the history information. The CPU 21 displays the time band in a gray-out manner or an OFF (hidden) manner in accordance with the operating status of each user terminal 2 and attendance information on each user included in the history information.

If the history information is the user data, the icon 14 associated with the user data may be displayed together with the user data. The icon 14 displayed in the history view 18, like the icon 14 displayed in the chat room 10, may be selected by the user. If a file is attached to the user data, the CPU 21 may display the icon 14H representing the file (see FIG. 5) together with the user data.

In step S440, the CPU 21 determines whether an unselected time band is present among the time bands set in step S400. If an unselected time band is present, the process returns to step S410 where the CPU 21 selects one time band from the unselected time bands as a new time band. Specifically, the CPU 21 iterates steps S410 through S440 until the CPU 21 determines in the determination operation in step S440 that no unselected time band is present any longer. The CPU 21 displays, in association with each selected time band, the history information on each user on the user terminal 2.

If the CPU 21 determines in the determination operation in step S440 that no unselected time band is present any longer, the history view display process in FIG. 18 ends. As described above, the history view 18 in FIG. 17 is displayed on the user terminal 2 that has transmitted the display instruction of the history view 18. The history view 18 displays, in a list, the user data on each user extracted from the chat room 10 in a time sequence and is thus an example of a list screen.

In step S430 in FIG. 18, the history view 18 associating the history information on each user with the selected time band is displayed. Among the users listed in the history view 18, some may live overseas. In such a case, the time band displayed in the history view 18 may be different from the local time of a user who lives overseas. The CPU 21 may switch the time band in the history view 18 to the time band in the time zone of an area where the user selected in the history view 18 lives. For example, the CPU 21 displays the local time for the area of person B corresponding to the local time 9:00 for person A. To this end, the CPU 21 may display, in the history view 18, the time band in the time zone of the area where a user selected in the history view 18 lives together with the time band in the time zone of the area where a user viewing the history view 18 lives.

As described with reference to the overhead view display process in FIG. 12, the CPU 21 may analyze the association relationship of the response information responsive to the user data serving as a starting point in the chat room 10. When the history view 18 is displayed on the user terminal 2, the CPU 21 may clearly indicate and display the user data in a response relationship in the history view 18.

In the history view 18 in FIG. 17, the user data of person A "Thank you" in the time band 10:00-11:00 is assumed to be a rely to the user data of person C "I've sent the fax" in the same time band. In this case, the CPU 21 sets the color of the characters (text) "I've sent the fax" of person C and the color of the text "Thank you" of person A to a common color that is different from the color of the text of the other user data such that the history view 18 is displayed to clearly indicate the response relationship. Further, if the user has selected the text "I've sent the fax" of person C, the CPU 21 may cause the text "Thank you" of person A to flash or cause a popup dialog for the text "Thank you" of person A to be displayed around the text "I've sent the fax" of person C.

The history view display process as described above is performed when a condition to display the history view 18 is specified, specifically, when a date of the history information to be displayed in the history view 18 and the length of the time band according to which the history information is categorized are specified. The CPU 21 may acquire another condition to display the history view 18.

For example, if a condition that only the user data with a particular icon 14 (such as the icon 14F indicating an agreement) selected is displayed in the history view 18 is specified, the CPU 21 extracts only the user data with the icon 14F selected and displays in the history view 18 the extracted user data on a per user basis and on a per time band basis.

If the icon 14H representing a file displayed in the history view 18 is selected, the CPU 21 may acquire from the chat room 10 a user name of a destination of the file associated with the selected icon 14H and user data exchanged between users about the file and re-arrange the user data in a time sequence such that the communication flow among users is recognizable. The CPU 21 may display the re-arranged user data together with the user name, for example, in a popup dialog box.

Since the history information is displayed in a time sequence on each user in a list in the history view 18, the CPU 21 may acquire the history information on a selected user from the history view 18 and generate a report recording user activity during a specific period of time, such as daily report, weekly report, or monthly report. The report may be created as a file and the file format of the report is not limited to any particular format. For example, the file format may be created in accordance with a document form, such as Extensible Markup Language (XML), or Comma Separated Value (CSV) form.

The user terminal 2 may be one of a variety of types of information devices that are connectable to the Internet 3. For example, the user terminal 2 may be a smart phone 30 or desktop computer 32. The display area of the screen displaying the chat room 10, the overhead view 16, and the history view 18 is different depending on the information device.

The CPU 21 may acquire from the user terminal 2 a display attribute that indicates the size of the display area of the screen of the user terminal 2, such as the screen size of the user terminal 2, and vary the display form of the categorized association information on a per category basis in accordance with the acquired display attribute of each user terminal 2.

Specifically, the display area of the screen of the smart phone 30, when used for the user terminal 2, is smaller than that of the desktop computer 32. When the overhead view 16 is displayed on the smart phone 30, the CPU 21 may display only the category specified by the user out of the dashboard region, notice region, and communication region instead of displaying the whole overhead view 16 illustrated in FIG. 5.

Figure 19:
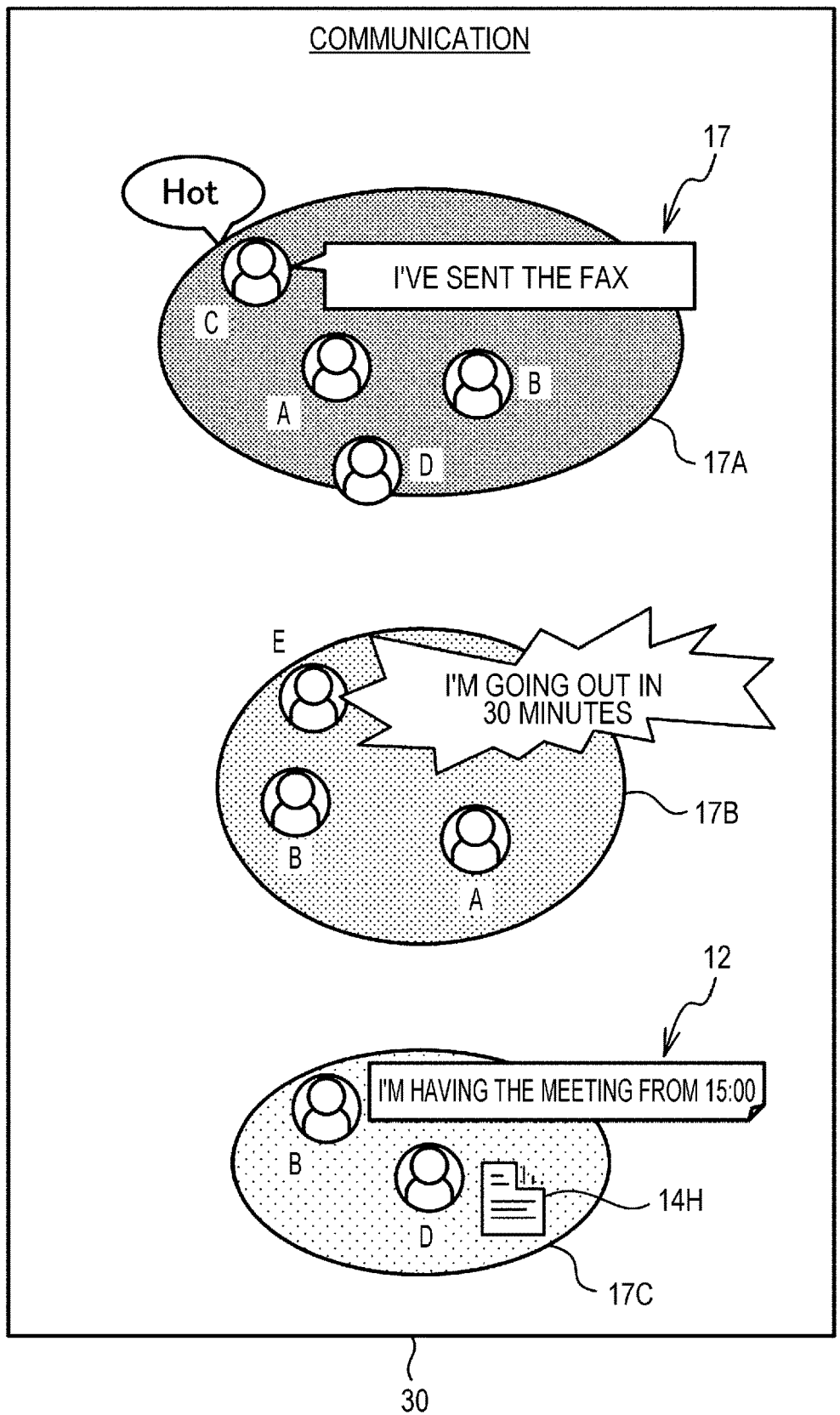
FIG. 19 illustrates a display example on an overhead view of a smart phone.

FIG. 19 illustrates a display example that displays only the communication region of the overhead view 16 on the smart phone 30. The smart phone 30 has a long shape with a vertical length thereof being longer than a lateral length thereof in the typical operating position thereof. Since the user views information on the screen by vertically scrolling the screen, the user may more easily view the information when the information is arranged in a vertical direction than when the information is arranged in a lateral direction.

On the desktop computer 32, the CPU 21 displays the groups 17 in a horizontally extended area as in the communication region of the overhead view 16 as illustrated in FIG. 5. On the smart phone 30, however, the CPU 21 displays the groups 17 vertically one above another in the communication region of the overhead view 16 as illustrated in FIG. 19. In this case, the CPU 21 may re-arrange the display order of the groups 17 such that a group 17 with the response information having a higher degree of response is located higher than a group 17 with the response information having a lower degree of response. In the communication region of the overhead view 16 in FIG. 19, the CPU 21 displays a group 17 in a larger size as the group 17 has a higher degree of response.

FIG. 20 illustrates a display example of the overhead view 16 displayed on the desktop computer 32. If the user terminal 2 is the desktop computer 32 with a screen having a larger display area, the dashboard region of the overhead view 16 in FIG. 5 may be displayed in a larger area as illustrated in the dashboard region in FIG. 20. In the communication region of the overhead view 16 in FIG. 20, the CPU 21 displays a group 17 in a larger size and closer to the center of the communication region as the group 17 has a higher degree of response than the other groups 17.

The chat server 6 in the information processing system 1 of the exemplary embodiment has been described. The chat server 6 disclosed herein has been described for exemplary purposes only. The chat server 6 is not limited to the scope of the exemplary embodiment described above. The exemplary embodiment may be changed or modified without departing from the scope of the disclosure. An embodiment resulting from changing or modifying the exemplary embodiment falls within the technological scope of the disclosure. For example, orders of operations in the nuance estimation process in FIGS. 8 and 11, the overhead view display process in FIG. 12, the communication display process in FIG. 13, the dashboard display process in FIG. 14, the notice display process in FIG. 15, and the history view display process in FIG. 18 may be changed without departing from the scope of the disclosure.

According to the exemplary embodiment, each of the processes described above is implemented by software. Alternatively, the processes defined by the flowcharts in FIG. 8, FIGS. 11 through 15, and FIG. 18 may be implemented by hardware. In such a case, each process may be performed faster than each process implemented by software.

In the embodiments above, the term "processor" refers to hardware in a broad sense. Examples of the processor include general processors (e.g., the CPU 21) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the embodiments, the information processing program is stored on the ROM 22. The storage destination is not limited to the ROM 22. The information processing program may be delivered in a recorded form by a recording medium readable by the computer 20. For example, the information processing program may be delivered by an optical disk, such as a compact disk read-only memory (CD-ROM) or digital versatile disk read-only memory (DVD-ROM). The information processing program may be delivered by a portable semiconductor memory, such as a universal serial bus (USB) memory or memory card. The ROM 22, non-volatile memory 24, CD-ROM, DVD-ROM, USB memory, and memory card are examples of non-transitory computer readable medium.

The chat server 6 may download the information processing program from an external device connected to the Internet 3 and store the downloaded information processing program on the recording medium. The CPU 21 in the chat server 6 reads the information processing program downloaded from the external device and performs the processes.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
acquire user data posted in a chat room participated in by a plurality of users;
group, in a category including the user data having response information that is responsive to the user data serving as a starting point, a series of pieces of the response information as a group forming a single communication, starting with the user data serving as the starting point;
estimate a feeling of a user by combining a feeling of the user estimated from a voice spoken by the user and a feeling of the user estimated from a user image obtained by photographing the user speaking the voice;
perform a time line analysis on the response information of the group;
display the user data in the chat room by using a balloon associated with feeling information representing the estimated feeling of the user;
change a display form of each group in accordance with a degree of response of the response information, the degree of response being represented by a posting time of the user data; and
with a plurality of display forms changed, display association information that associates at least one piece of information of the user data or the response information responsive to the user data with a user having posted the user data and the posting time of the user data.

2. The information processing apparatus according to claim 1, wherein the processor is configured to:
categorize the user data into a plurality of categories according to at least one piece of information of feeling information attached to the user data or the response information responsive to the user data; and
display the association information in a display form that is different from category to category.

3. The information processing apparatus according to claim 2, wherein the processor is configured to:
acquire a display attribute of an information device used by a user participating in the chat room; and
in accordance with the display attribute of the information device acquired on a per user basis, change for the information device the display form of the association information on each category.

4. The information processing apparatus according to claim 1, wherein the processor is configured to extract, in accordance with a condition specified by a user, the user data posted in the chat room and display the association information on each of the users by using the extracted user data.

5. The information processing apparatus according to claim 2, wherein the processor is configured to extract, in accordance with a condition specified by a user, the user data posted in the chat room and display the association information on each of the users by using the extracted user data.

6. The information processing apparatus according to claim 3, wherein the processor is configured to extract, in accordance with a condition specified by a user, the user data posted in the chat room and display the association information on each of the users by using the extracted user data.

7. The information processing apparatus according to claim 4, wherein the processor is configured to display a list screen that lists the user data extracted in a time sequence on each of the users and generate from the list screen a report recording an activity status of each of the users during a specific period of time.

8. The information processing apparatus according to claim 5, wherein the processor is configured to display a list screen that lists the user data extracted in a time sequence on each of the users and generate from the list screen a report recording an activity status of each of the users during a specific period of time.

9. The information processing apparatus according to claim 7, wherein the processor is configured to display the user data on the list screen such that a partner of the communication is recognized from the user data.

10. The information processing apparatus according to claim 1, wherein the processor is configured to:
estimate a feeling of a user from a voice spoken by the user;
segment the voice at a transition where a type of the estimated feeling changes; and
generate the user data by attaching feeling information representing the estimated feeling of the user to a character representing each segmented voice.

11. The information processing apparatus according to claim 10, wherein the processor is configured to modify the feeling information attached to the user data to feeling information specified by the user.

12. The information processing apparatus according to claim 10, wherein the processor is configured to re-segment the user data, generated by segmenting the voice, at a segmentation location specified by the user and display the re-segmented user data in the chat room.

13. The information processing apparatus according to claim 1, wherein the processor is configured to:
display the response information that is responsive to the user data serving as the starting point in a larger size in the group than a size of the user data serving as the starting point.

14. The information processing apparatus according to claim 1, wherein the processor is configured to:
when the group has a higher posting frequency of the response information per unit time than other groups, set a display area of the group to be larger than display areas of the other groups.

15. The information processing apparatus according to claim 1, wherein the processor is configured to:
when the group has a higher posting frequency of the response information per unit time than other groups, change a background color of a display area of the group and the response information, and change a color and a size of characters displaying the user data serving as the starting point.

16. An information processing method comprising:
acquiring user data posted in a chat room participated in by a plurality of users;
group, in a category including the user data having response information that is responsive to the user data serving as a starting point, a series of pieces of the response information as a group forming a single communication, starting with the user data serving as the starting point;
estimating a feeling of a user by combining a feeling of the user estimated from a voice spoken by the user and a feeling of the user estimated from a user image obtained by photographing the user speaking the voice;

perform a time line analysis on the response information of the group;

displaying the user data in the chat room by using a balloon associated with feeling information representing the estimated feeling of the user;

change a display form of each group in accordance with a degree of response of the response information, the degree of response being represented by a posting time of the user data; and with a plurality of display forms changed, displaying association information that associates at least one piece of information of the user data or the response information responsive to the user data with a user having posted the user data and the posting time of the user data.

17. A non-transitory computer readable medium storing a program causing a computer to execute a process, the process comprising:

acquiring user data posted in a chat room participated in by a plurality of users;

grouping, in a category including the user data having response information that is responsive to the user data serving as a starting point, a series of pieces of the response information as a group forming a single communication, starting with the user data serving as the starting point;

estimating a feeling of a user by combining a feeling of the user estimated from a voice spoken by the user and a feeling of the user estimated from a user image obtained by photographing the user speaking the voice;

performing a time line analysis on the response information of the group;

displaying the user data in the chat room by using a balloon associated with feeling information representing the estimated feeling of the user;

changing a display form of each group in accordance with a degree of response of the response information, the degree of response being represented by a posting time of the user data; and with a plurality of display forms changed, displaying association information that associates at least one piece of information of the user data or the response information responsive to the user data with a user having posted the user data and the posting time of the user data.

\* \* \* \* \*